(12) United States Patent
Ragan et al.

(10) Patent No.: US 12,353,826 B2
(45) Date of Patent: Jul. 8, 2025

(54) DYNAMIC PRESENTATION GENERATION

(71) Applicant: Seismic Software, Inc., San Diego, CA (US)

(72) Inventors: Lisa Ragan, San Diego, CA (US); Alex Morrow, Chicago, IL (US); Ian White, Chicago, IL (US)

(73) Assignee: Seismic Software, Inc., San Diego, CA (US)

( * ) Notice: Subject to any disclaimer, the term of this patent is extended or adjusted under 35 U.S.C. 154(b) by 0 days.

(21) Appl. No.: 18/747,854

(22) Filed: Jun. 19, 2024

(65) Prior Publication Data

US 2024/0427984 A1    Dec. 26, 2024

Related U.S. Application Data

(60) Provisional application No. 63/522,305, filed on Jun. 21, 2023.

(51) Int. Cl.
  *G06F 17/00*   (2019.01)
  *G06F 40/186*  (2020.01)
  *G06F 40/197*  (2020.01)

(52) U.S. Cl.
  CPC .......... *G06F 40/186* (2020.01); *G06F 40/197* (2020.01)

(58) Field of Classification Search
  CPC .... G06F 40/186; G06F 40/197; G06F 3/4815; G06F 8/41; G06F 16/9535; G06F 16/9577; G06F 16/9538; G06F 3/0481; G06F 16/178; G06F 16/1774; G06F 16/9038; G06F 16/951; G16H 10/60; G16H 40/20

USPC ........................................................ 715/221
  See application file for complete search history.

(56) References Cited

U.S. PATENT DOCUMENTS

| | | | |
|---|---|---|---|
| 10,162,877 B1* | 12/2018 | Ferguson | G06F 8/41 |
| 2008/0276164 A1* | 11/2008 | Bamford | G06F 16/9535 715/238 |
| 2014/0096015 A1* | 4/2014 | Grosz | G06F 3/1242 715/738 |
| 2014/0108043 A1* | 4/2014 | Ach | G16H 10/60 705/3 |
| 2014/0222627 A1* | 8/2014 | Kukreja | G06Q 30/0643 705/27.2 |
| 2014/0372415 A1* | 12/2014 | Fernandez-Ruiz | G06F 16/9577 707/722 |
| 2015/0248698 A1* | 9/2015 | Bhattacharjee | G06Q 30/0277 707/723 |
| 2016/0110313 A1* | 4/2016 | Prakash | G06F 30/00 715/202 |
| 2017/0177175 A1* | 6/2017 | Lai | G06F 16/489 |
| 2022/0124055 A1* | 4/2022 | Sharifi | H04L 51/02 |

* cited by examiner

*Primary Examiner* — Jason T Edwards
(74) *Attorney, Agent, or Firm* — Van Pelt, Yi & James LLP

(57) ABSTRACT

Dynamic presentation generation is disclosed, including: receiving a selection of a presentation template, wherein the presentation template references a set of assets stored at a content storage; selecting a subset of the set of assets based at least in part on a set of user inputs; and dynamically generating a presentation using at least the presentation template, the subset of the set of assets, and the set of user inputs.

19 Claims, 18 Drawing Sheets

Pitch Presentation Template  Details

Preliminary questions*  ⌃
- Seismic
- Slide will appear here

Products
4  Slide will appear here  ⌃

Case Studies
5  Slide will appear here  ⌃

Appendix
6  Slide will appear here  ⌃

+ Add content

---

Save progress  | Export to WorkSpace — 1502

Time Savings Calculator

Use Case* ⓘ
[Pitch Deck Personalization ▸]

For pitch deck personalization, use LiveInsights to determine the content count and total downloads Content Count ⓘ
[1000]

Total Downloads ⓘ
[900]

Work with your customer to determine the fully loaded, average seller salary

Avg Seller Salary ($USD) ⓘ
[60000]

See note for both of the time spent assumptions for these values.

Time Spent Per Unique Output Today (manual) ⓘ
[60]

Time Spent Per Unique Output w/ Guided Assembly ⓘ
[5]

6/6 questions

Back  Next

FIG. 15

Pitch Presentation Template Details

Preliminary questions*
- Seismic
- Slide will appear here

Products
4. Slide will appear here

Case Studies
5. Slide will appear here

Appendix
6. [content placeholder]

+ Add content

Save progress | Export to WorkSpace

Use Case Opportunity:
Estimated Based On Gained Efficiency w/ Seismic

The problem:
Personalizing content is difficult and unmanageable

- Manual process
- Time-consuming
- Lacking guidance

- Content is scattered
- Inconsistent brand & messaging
- Introduces risk to the business

By the numbers for:

| Total Pitch Decks in Seismic | Total Downloads (over past 12 mos) | Time Spent Personalizing Before (per asset) | Time Spent Personalizing After (per asset) |
|---|---|---|---|
| 1,000 | 900 | 60 mins | 5 mins |

6 /6 questions     Assumes an average $60,000.00 annual salary

The cost to your business:
900 Hours
Spent over previous year personalizing pitch decks You could have saved
825 Hours

$24,750
Capacity Equivalent based on hours you could have saved

DYNAMIC PRESENTATION GENERATION

CROSS REFERENCE TO OTHER APPLICATIONS

This application claims priority to U.S. Provisional Patent Application No. 63/522,305 entitled DYNAMIC PRESENTATION TEMPLATE TRANSLATION filed Jun. 21, 2023 which is incorporated herein by reference for all purposes.

BACKGROUND OF THE INVENTION

Similar presentations may need to be made by an organization for different audiences. For example, an enterprise may need to maintain different versions of a particular presentation (e.g., set of slides) for different audiences (e.g., different customers). However, if a portion that is common to different versions of the presentation needs to be changed, then the different versions will need to be individually and manually updated to ensure that the change is propagated across all of the different versions. However, it is laborious to propagate changes across multiple files and there is also a risk of error for when the changes are needed to be manually propagated across multiple versions of a presentation. It would be desirable to generate customized presentations in an efficient manner and avoid needing to manage version control on presentations.

BRIEF DESCRIPTION OF THE DRAWINGS

Various embodiments of the invention are disclosed in the following detailed description and the accompanying drawings.

FIG. 7 is a diagram showing an example of a template designer user interface at which a designer user can configure preliminary questions of a presentation template.

FIG. 8 is a diagram showing an example of a template designer user interface at which a designer user can configure new sections of a presentation template.

FIG. 9 is a diagram showing an example of a template designer user interface at which a designer user can configure aspects of a particular section of a presentation template.

FIG. 10 is a diagram showing another example of a template designer user interface at which a designer user can configure aspects of a particular section of a presentation template.

FIG. 12 is a diagram showing an example of a presentation assembly user interface at which an end user can select a referenced candidate asset within a particular section of a selected presentation template.

FIG. 13 is a diagram showing another example of a presentation assembly user interface at which an end user can edit a selected referenced candidate asset within a particular section of a selected presentation template.

FIG. 14 is a diagram showing an example of a presentation assembly user interface at which an end user is prompted to provide values corresponding to variables embedded in a selected candidate asset within a particular section of a selected presentation template.

FIG. 15 is a diagram showing an example of a presentation assembly user interface at which an end user is prompted to provide values corresponding to a form associated with a selected candidate asset comprising a mini app within a particular section of a selected presentation template.

FIG. 16 is a diagram showing an example of a presentation assembly user interface at which an end user had provided values to a form associated with a selected candidate asset comprising a mini app within a particular section of a selected presentation template.

FIG. 17 is a diagram showing an example of a presentation assembly user interface that presents a notification that a selected candidate asset that is included in an assembly built from a selected presentation template has been updated.

FIG. 18 is a diagram showing an example of a presentation assembly user interface that is presenting analytics regarding the usage of a selected presentation template.

DETAILED DESCRIPTION

Figure 1:
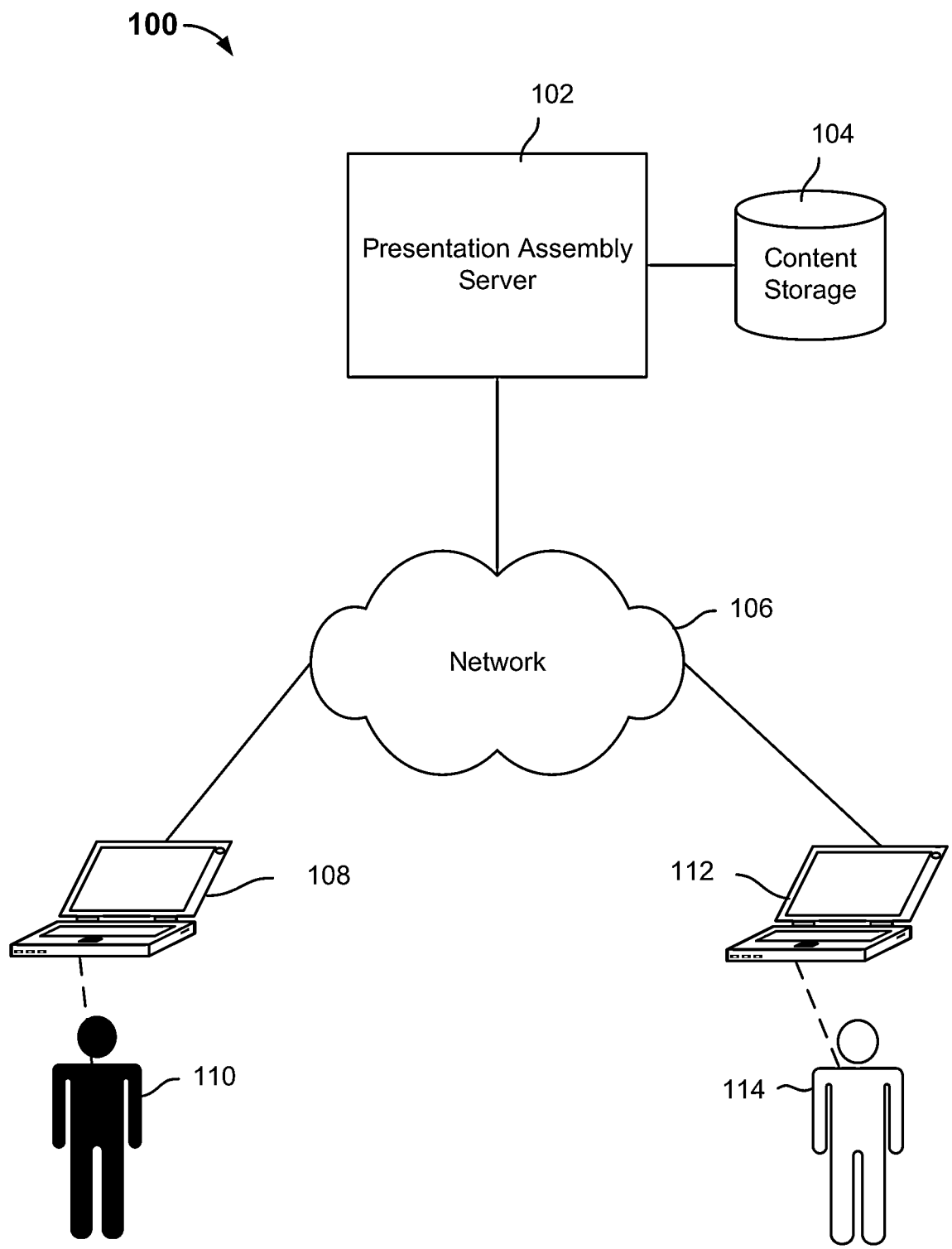
FIG. 1 is a diagram showing an embodiment of a system for dynamic presentation generation.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of dynamic presentation generation are described herein. A selection of a presentation template is received. The presentation template references a set of assets that are stored at a content storage. In various embodiments, the presentation template was selected to use in a guided assembly of a presentation by an end user via a presentation assembly user interface at an "assembly time." In various embodiments, the presentation template was designed at an earlier "design time" by a designer user via a template designer user interface. The presentation template is agnostic to the file type of a presentation that can be assembled using the presentation template. In some embodiments, the presentation template comprises a series of sections and where each section was designed to reference a corresponding set of candidate assets that are stored in the content storage. Examples of types of assets may include slide decks (e.g., Microsoft PowerPoint® or Google Slides®), videos, images, and documents. At the assembly time, a subset of the set of assets (e.g., across the one or more sections of the presentation template) that are referenced by the template is selected based at least in part on a set of end user inputs. In some embodiments, the end user can select at least one of the candidate assets that are referenced in each section of the presentation template. The presentation template is then dynamically translated using at least the selected subset of the set of assets and the set of user inputs into a presentation (e.g., of a selected file type). In some embodiments, the presentation comprises the collection/series of the candidate assets that were selected by the end user from each section of the presentation template and where the collection of assets were manipulated by a construction engine to result in the presentation of the selected file type (e.g., Microsoft PowerPoint®, Google Slides®, a video, or a document).

FIG. 1 is a diagram showing an embodiment of a system for dynamic presentation generation. In the example of FIG. 1, system 100 includes presentation assembly server 102, content storage 104, network 106, designer user device 108, and end user device 112. In some embodiments, network 106 comprises one or more data and/or telecommunications networks. In some embodiments, presentation assembly server 102, content storage 104, designer user device 108, and end user device 112 are configured to communicate with each other over network 106. Examples of designer user device 108 and end user device 112 may include laptop computers, desktop computers, mobile devices, tablets, and/or any networked device.

Content storage 104 comprises a content library that is configured to store assets. In various embodiments, each asset stored at content storage 104 includes zero or more tags (or other types of metadata), which can be searched for during the designing of a presentation template and also the building of an assembly based on that presentation template during a later assembly time. In some embodiments, content storage 104 stores assets of different file types. As mentioned above, examples of types of assets may include slides (e.g., Microsoft PowerPoint® or Google Slides®), videos, images, and documents. Another example type of asset is a software application (or sometimes referred to as a "mini app"), which comprises logic that can be executed to generate a form to solicit values and then generate an output (e.g., a document or slide) based on input values. For example, content storage 104 may store similar assets but with different attributes and therefore tags. Specifically, similar assets stored at content storage 104 might be in different languages, be localized to different regions, and include relevant content that is specific to a particular audience. In a specific example, three different assets (slide decks) stored at content storage 104 may each include text related to providing an overview of the leadership and history of an enterprise, only that a first slide deck is in English, the second slide deck is in French, and the third slide deck is in Japanese. In some embodiments, before an asset is permitted to be stored at and/or accessible from content storage 104 ("published" at the content library), the asset is first subject to an approval process to ensure that only assets that meet desired criteria are made available at content storage 104 to be referenced in presentation templates at design time and/or pulled into the translation of a presentation template at assembly time, as will be described in further detail below. Content storage 104 may be dynamically updated to receive new assets and updated assets that replace previously stored assets by one or more content contributor users (not shown in FIG. 1). For example, various content contributor users that are proficient in different languages, different domain expertise, and different asset type generation can create assets (e.g., that are associated with corresponding tags of their attributes such as language, category, department, relative time period) that are stored at content storage 104 and then update the assets, as needed, over time.

Presentation assembly server 102 is configured to access content storage 104 (e.g., locally or over a network such as network 106). In various embodiments, presentation assembly server 102 is configured to provide a presentation template tool to a designer device such as designer device 108 to enable a designer user such as user 110 to create a presentation template. In various embodiments, the presentation template tool that is provided by presentation assembly server 102 comprises a user interface-based tool, which is sometimes referred to as the "template designer user interface." The time at which a designer user such as user 110 uses the template designer user interface to create a presentation template is sometimes referred to as "design time." As will be described in further detail below, at design time, the designer user (e.g., user 110) can create a reusable outline of a presentation. In particular, the designer user can create a new template or edit an existing template by adding to or removing one or more sections from the template. In various embodiments, using the template designer user interface, the designer user can configure for each section of the template, a set of candidate assets stored at content storage 104 that an end user (e.g., user 114) can select one or more candidate assets thereof, at a later assembly time, to complete that section. Put another way, at design time, the designer user can designate a subset of assets available at content storage 104 to form the set of options of a particular section of the template that an end user can later select from at assembly time to build out a corresponding portion of a presentation. As each section of the presentation template may be associated with a particular segment of a presentation (e.g., introduction, executive summary, key points, conclusion), the designer user can identify the candidate assets within content storage 104 that are most relevant or best suited to each section of the template and then configure references in that section of the template to those assets in content storage 104. After the designer user has finished creating a presentation template using the template designer user interface, the presentation template is stored by presentation assembly server 102. As will be described in further detail below, the stored presentation template is not specific to any particular presentation file type (e.g., a Google Slide®, a Microsoft PowerPoint®, or a PDF).

In various embodiments, presentation assembly server 102 is configured to provide a presentation assembly/building tool to an end user device such as end user device 112 to enable an end user such as user 114 to assemble a presentation from a selected presentation template (e.g., that was previously created by a designer user such as designer user 110). In various embodiments, the presentation assembly tool that is provided by presentation assembly server 102 comprises a user interface-based tool, which is sometimes referred to as the "presentation assembly user interface." The time at which an end user such as user 114 uses the presentation assembly user interface to build/assemble a presentation from a selected presentation template is sometimes referred to as "assembly time." As will be described in further detail below, at assembly time, the end user (e.g., user 114) can select a stored presentation template and the presentation assembly user interface will guide/prompt the end user through each section of the template to solicit for "just-in-time" inputs and selections of candidate assets (e.g., stored at content storage 104) that are referenced by each section of the template. In response to the end user's selection to output the presentation in a specified presentation/file type (e.g., a Google Slide®, a Microsoft PowerPoint®, a PDF, a video, a document), in some embodiments, presentation assembly server 102 is then configured to dynamically translate the selected presentation template by obtaining the candidate assets that were referenced by the template and selected by the end user and combining the obtained assets with the "just-in-time" inputs. In particular, presentation assembly server 102 is configured to use a construction engine corresponding to the specified presentation/file to manipulate the markup language (e.g., XML) or data format (e.g., JSON) associated with the specified presentation/file type to create a presentation of that file based on the presentation template, the candidate assets obtained at that time, and the "just-in-time" inputs. In some embodiments, presentation assembly server 102 is configured to store each instance of an end user's assembly/build (comprising the selections of candidate assets and "just-in-time" inputs) associated with a presentation template. In some embodiments, presentation assembly server 102 is configured to store each instance of a presentation associated with a specified file type that is generated from an end user's assembly/build (comprising the selections of candidate assets and "just-in-time" inputs) associated with a presentation template.

While FIG. 1 shows only one designer user, designer user 110, in practice, any number of designer users can use the template designer user interface to create different types of presentation templates. For example, a designer user can be any user that has the expertise to create outlines of presentations and identify assets that might be relevant to each section of an outline. While FIG. 1 shows only one end user, end user 114, in practice, any number of end users may select a presentation template, generate an assembly from that template, and request for output presentation(s) in one or more files based on that assembly. For example, an end user can be any user that desires to efficiently author presentations using the guidance of pre-selected relevant assets that have been referenced by a selected presentation template.

Given that different end users can select different candidate assets that are referenced by a presentation template, the same template can be efficiently reused by the different end users to create and save different assemblies. Furthermore, because the selected candidate assets associated with a particular assembly that is created using a template are not retrieved from content storage 104 until a request to output a presentation with a specified presentation/file type is received, the generated presentation always uses the most current versions of the selected assets without requiring any manual updating to the assets by the end users. As such, content contributor users can asynchronously add new assets and update existing assets to content storage 104 and if such assets are referenced by a template, the end users can be assured that only the most current versions of the selected assets at the time of presentation generation from a particular assembly from the template will actually be included in the presentation. In this way, at assembly time, one or more end users can leverage a presentation template to efficiently create and customize different variants of a presentation with varying selections of selected candidate assets and/or differing just-in-inputs. In a specific example, the same presentation template for providing an introduction of an enterprise can be used by end users in sales roles to create variations of an introduction presentation and where the variant presentations address different audiences (e.g., different potential clients), use different languages, are in different file formats, and/or include assets that are not used by other presentations that are translated from the same template. As will be described in further detail below, this form of guided assembly and subsequent presentation generation using a presentation template can enable end users to easily customize new versions of presentations from a template over time, as needed, without needing to perform manual updates to the assets themselves or needing to maintain version control on previously generated presentations.

Figure 2:
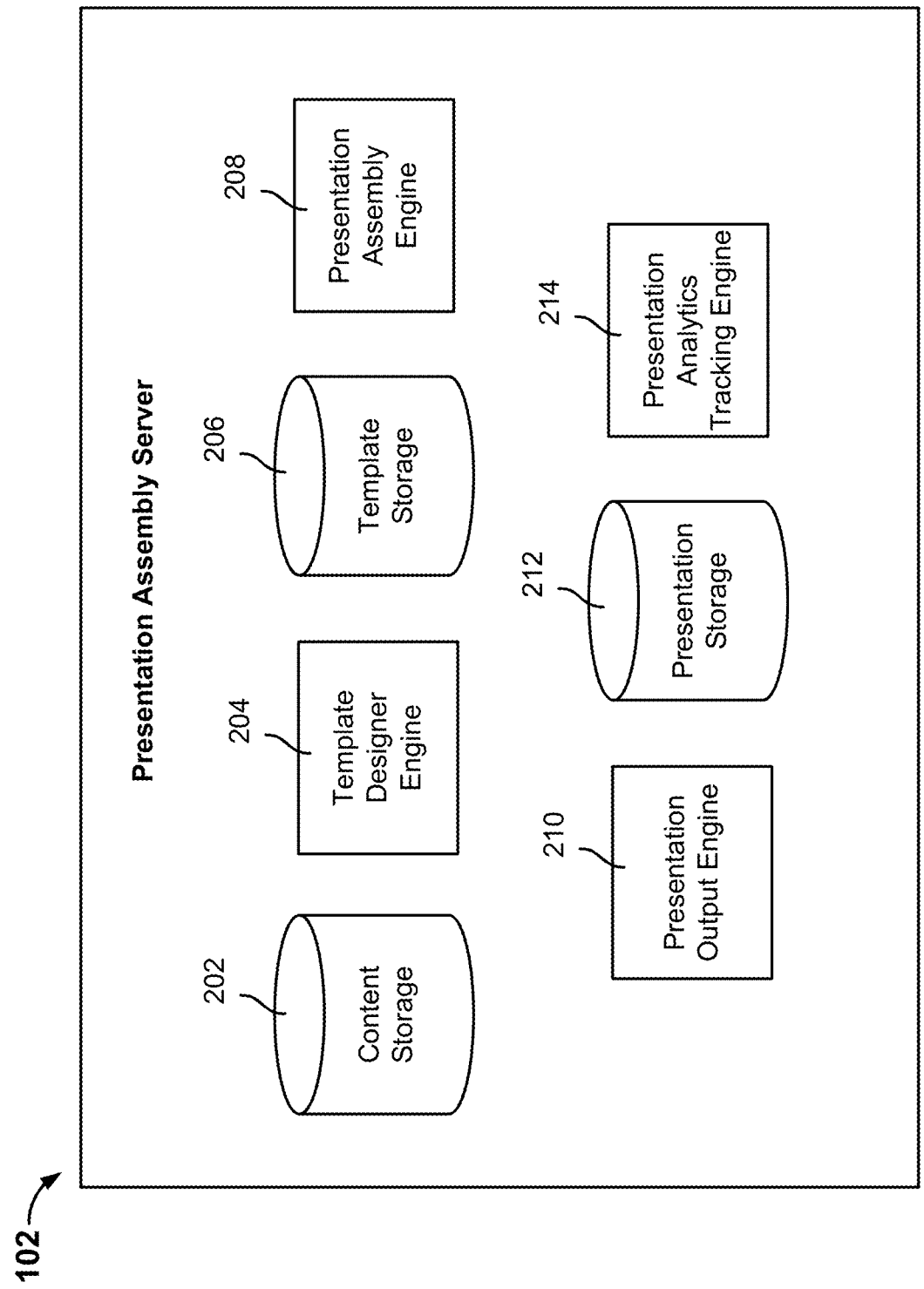
FIG. 2 is a diagram showing an example of a presentation assembly server in accordance with some embodiments.

FIG. 2 is a diagram showing an example of a presentation assembly server in accordance with some embodiments. In some embodiments, presentation assembly server 102 of FIG. 1 may be implemented using the example presentation assembly server of FIG. 2. The example presentation assembly server in FIG. 2 includes content storage 202, template designer engine 204, template storage 206, presentation assembly engine 208, presentation output engine 210, presentation storage 212, and presentation analytics tracking engine 214. Each of content storage 202, template designer engine 204, template storage 206, presentation assembly engine 208, presentation output engine 210, presentation storage 212, and presentation analytics tracking engine 214 may be implemented using hardware (e.g., one or more processors and memories) and/or software.

Content storage 202 is configured to store assets that are associated with metadata. As mentioned above, examples of asset types include slides (e.g., Microsoft PowerPoint® or Google Slides®), videos, images, documents, and mini apps. In some embodiments, an asset may be embedded with a variable that is to be updated and dynamically replaced with an end user submitted value at assembly time. In some embodiments, an asset comprising a mini app comprises logic with a form for soliciting end user submitted values and where the logic is to be executed at assembly time to generate an output (e.g., a set of slides) based on the end user submitted values. Each asset stored at content storage 202 is configured with metadata (e.g., properties/tag) that indicates, for example, asset type and when to use such content. One example type of asset metadata includes a description of the asset's content (e.g., "Cover slides," "Company Overview Slides," "Case Studies," "Product Sheets," and "ROI calculators"). Another type of asset metadata is a content property and an associated value. One example of a content property is called "Segment" and is associated with a list of possible values such as "Technology," "Medicine,"

and "Financial Services." For example, an asset that is relevant to the technology industry would be tagged with the content property and value pair of "Segment—Technology." Another example of a content property is called "Geographic Region" and is associated with a list of possible values such as "Asia," "North America," and "Europe." For example, an asset that is relevant to the Asian countries would be tagged with the content property and value pair of "Geographic Region—Asia." Assets' content properties and their associated possible values can be customizable/defined by content contributors. In some embodiments, content storage 202 can store multiple variants of an asset and where each variant shares common properties and has different properties from other variants of the asset. For example, variant assets comprising the same slides but in different languages can be stored at content storage 202 so that the assets can be alternative candidate assets that might be configured by a designer user to be referenced in the same section of a presentation template. In some embodiments, new assets can be added to, existing assets can be modified at, and existing assets can also be deleted from content storage 202. For example, a new asset including the latest financial information can be added (e.g., by content contributors) quarterly to content storage 202. In some embodiments, before an asset can be added to content storage 202, it is first evaluated against publishing criteria (e.g., whether the content and formatting conform to a desired quality and structure) and the asset can only be added to content storage 202 if the criteria is met. The publishing criteria are enforced to ensure that only assets of high quality are added to content storage 202 because such assets may be referenced by numerous presentation templates and then actually selected and pulled into a large number of presentations.

Template designer engine 204 is configured to provide a template designer user interface to a designer user device to enable the user to create a presentation template (e.g., at design time). In some embodiments, the template designer user interface provided by template designer engine 204 is provided as a web application. In some embodiments, the template designer user interface enables the designer user to optionally configure preliminary questions and where each preliminary question includes a set of options that are the possible values associated with a specified asset content property. For example, a preliminary question can be "Please select a relevant industry" and the configured list of options may include the possible values associated with the content propriety of "Segment" such as "Technology," "Medicine," and "Financial Services." In various embodiments, the template designer user interface also enables the designer user to create an outline of the presentation template by creating one or more sections and then associate relevant candidate asset(s) from a content storage with each section. Example sections for a presentation template that provides an introduction to an enterprise may include the following example sections: "Introduction," "Company Overview," "Product Information," "Success Stories," and "Conclusion." In a first example, the designer user can create a reference to relevant candidate asset(s) from a content storage to a section of the presentation template by manually selecting (e.g., through an embedded interface of the template designer that previews the currently available assets at the content storage) the one or more assets that may be relevant to that section of the template. In a second example, the designer user can create a reference to relevant candidate asset(s) from a content storage to a section of the presentation template by configuring rule(s) that will dynamically locate assets from the content storage at assembly time that match those rule(s). For example, a rule prescribes that any assets under a specified file path/directory can be presented as a candidate asset for that section during assembly. As such, these configured references to candidate assets at the content storage (e.g., manual selections or configured rules) are stored with each section of the presentation template. It is possible that alternative candidate assets that are associated with different content property values (e.g., different segments or different geographic regions) can be configured for the same section of the presentation template because, as will be described in further detail below, during assembly time, only the subset of referenced candidate assets in a section that matches the end user's response (e.g., a selected "Segment" value) to a preliminary question will be presented as options for selection for that section of the template. In addition to associating relevant candidate assets with a section of a presentation template, in some embodiments, the template designer user interface also enables the designer user to configure one or more input fields into that section.

Template storage 206 is configured to store presentation templates that are created by designer users (e.g., using the template designer user interface provided by template designer engine 204). A presentation template stored at template storage 206 can be restored and edited by a designer user. A presentation template stored at template storage 206 can also be selected by an end user at assembly time at a presentation assembly user interface and used to guide the end user through the assembly of a presentation. In various embodiments, presentation templates are stored at template storage as JSON files.

Presentation assembly engine 208 is configured to provide a presentation assembly user interface to an end user device to enable the user to assemble and output a presentation from a selected presentation template (e.g., at assembly time). In some embodiments, the presentation assembly user interface provided by presentation assembly engine 208 is provided as a web application. In various embodiments, the presentation assembly user interface prompts the end user to select a presentation template (e.g., from those stored at template storage 206). Then, the presentation assembly user interface guides (e.g., via prompting) the end user through the (e.g., preliminary) questions and series of sections of the selected presentation template to build/create an instance of a presentation assembly from the template. In various embodiments, an instance of a presentation assembly comprises a particular end user's selections of candidate assets referenced in section(s) of the presentation template and other "just-in-time" inputs (e.g., responses to preliminary questions, values to variables embedded in the selected candidate assets, values to input fields in a section). In various embodiments, the presentation assembly user interface prompts the end user for responses (e.g., selections among presented options) corresponding to each preliminary question of the presentation template. In various embodiments, for each section of the presentation template, the presentation assembly user interface presents the candidate assets that are referenced by that section. For example, the presented candidate assets that are referenced by that section exclude the referenced candidate assets with metadata (e.g., content property value pairs) that do not match the end user's responses to the preliminary questions. In response to the presentation of candidate assets that are presented by the presentation assembly user interface for a particular section of the presentation template, the end user can select one or more of the presented candidate assets and/or edit a portion of the selected candidate sets to indicate a desire to add that selected candidate asset into the current assembly. In some embodiments, if the type of candidate asset that is selected for a section of the presentation template is a mini app comprising logic to be executed, the presentation assembly user interface further prompts the end user to complete a form associated with the mini app such that the mini app can execute the logic based on the values input into the form to dynamically generate a new asset that is included in the current assembly. In some embodiments, if the type of candidate asset that is selected for a section of the presentation template includes a variable to be updated, the presentation assembly user interface further prompts the end user to submit a value to replace that variable and the version of the asset with the submitted variable value is included in the current assembly. In various embodiments, for each section of the presentation template, the presentation assembly user interface prompts the end user to input text corresponding to one or more input fields and/or make selections from a configured menu of options, if any, configured for that section. The assembly of a presentation template is completed when the presentation assembly user interface has received end user selection(s) of candidate assets(s) and/or input values to just-in-time questions associated with all of the sections/questions of the presentation template.

In some embodiments, presentation assembly engine 208 is configured to use machine learning and/or stored analytics with respect to the historical end user usage of a presentation template to programmatically highlight candidate assets referenced by a section to select or recommend text to populate into the just-in-time questions of a presentation template. In this way, the presentation assembly user interface can guide the end user to completing an assembly based on a presentation template even more efficiently by leveraging artificial intelligence and/or drawings from the historical usage of the template by previous end users.

Presentation output engine 210 is configured to output a presentation assembly built from a presentation template into a presentation of a specified file type. After the assembly of a presentation template is completed, the end user can select at the presentation assembly user interface to output ("export") the assembly as a presentation of a specified file type. Examples of possible presentation files includes a Google Slide®, a Microsoft PowerPoint®, a PDF, a document, or a video. Whereas the presentation template itself is agnostic to the possible presentation files and the candidate assets that were selected to be included in the particular assembly may be of different files (e.g., Google Slides®, a Microsoft PowerPoint slides, JPEG, PNG, Microsoft Word® document, etc.), at the point/time of outputting the assembly into a presentation of a selected file type, the template is translated with the built assembly into a presentation file of the selected file type. In some embodiments, the template is translated by a construction engine (e.g., a software application) that is specific to the selected file type (or the file type of the selected candidate assets) and where the construction engine uses the outline provided by the template and converts the file format of the components of the assembly into the specified file type. In particular, at the time of outputting the presentation file, the construction engine can dynamically pull/obtain the (most current version) of the candidate assets (from a content storage) that have been included in the presentation assembly and then operate on the underlying file format (e.g., JSON, XML, JPEG, PNG, TXT) of the obtained assets to convert them into the selected file type to generate the desired presentation instance. In some embodiments, if an asset that was selected to be included in the assembly of a template has been updated since the creation of the assembly and/or the previous output of a presentation file from the assembly, then the presentation assembly user interface is configured to present a notification that the asset has changed so that the end user is aware of the update. With this notification, the end user can see their current version of the presentation and the new version of the presentation. The new version may have visual differences highlighted so they can quickly determine what the changes are and if they want to update their presentation with the updated asset.

Presentation storage 212 is configured to store one or more instances of presentation assemblies built by end user(s) from a corresponding presentation template. Presentation storage 212 is configured to store one or more instances of presentations that are output from each instance of an assembly that is built from a corresponding presentation template. For example, two different presentation files that are output from the same assembly that is built from a corresponding presentation template may be generated as different files. In another example, two different presentation files that are output from the same assembly that is built from a corresponding presentation template may include different versions of the same asset if the presentation files were output at different times and the same asset had been updated in the interim.

Presentation analytics tracking engine 214 is configured to track analytics associated with the usage of presentation templates (e.g., stored at template storage 206). As described above, various different assemblies can be built from the same presentation template by one or more end users where each assembly comprises its own set of just-in-time inputs, including the selection of candidate assets. Furthermore, various different presentation files (e.g., presentations in different files and/or generated at different times) can be generated from the same assembly built from the presentation template. Put another way, each time a presentation is generated from this template translation process, all of the assets that are included in the generated instance are tracked. The end user is able to create many versions of a presentation from the same presentation template and all the information about which assets are included in each version is stored as a different stage in the process. As such, presentation analytics tracking engine 214 is configured to monitor and record assembly time statistics including for example, which and how many users have selected a presentation template for assembly, which reference candidate assets are selected for each assembly of a selected presentation template, which just-in-time inputs are input for each assembly of the selected presentation template. By retaining the data about usage, analytics are built to inform asset owners what and how content is being used. If end users were to use authoring tool apps (e.g., Google Slide® and Microsoft PowerPoint®) directly without the tools described herein, these analytics would be non-existent and as result, content owners would have no visibility into when their assets were included into new presentations. As mentioned above, the per asset, per presentation template, and/or per built assembly analytics that are tracked by presentation analytics tracking engine 214 may be used by presentation assembly engine 208 to make recommendations of which candidate assets to select and/or which values to input for just-in-time questions during the guided assembly process.

Figure 3:
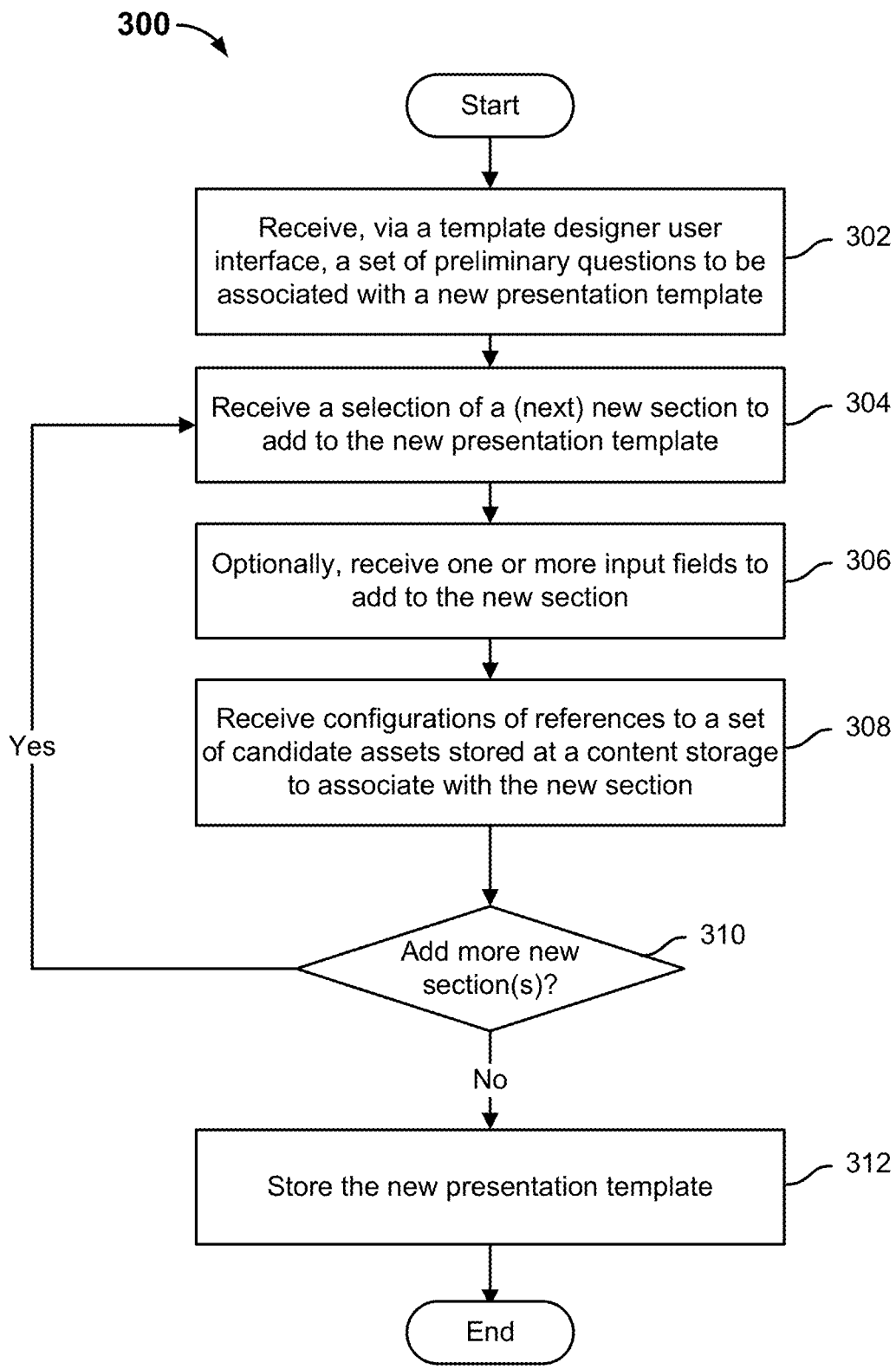
FIG. 3 is a flow diagram showing an example process for enabling a creation of a new presentation template in accordance with some embodiments.

FIG. 3 is a flow diagram showing an example process for enabling a creation of a new presentation template in accordance with some embodiments. In some embodiments, process 300 may be implemented at presentation assembly server 102 of FIG. 1.

At 302, a set of preliminary questions to be associated with a new presentation template is received via a template designer user interface. The configurations of one or more preliminary questions that will prompt the end user to select from among a set of presented response options (e.g., possible values of a specified content property) are received through the template designer user interface. For example, a preliminary question may prompt the end user to select a language (e.g., English, French, German) with which the candidate assets that are to be presented in each section of the template should be associated. As will be described in further detail below, the end user's response to a preliminary question at assembly time can filter out candidate assets referenced by sections of the template that do not match (e.g., do not have the content property value that matches) the end user's response. For instance, if the end user responds with "English" to a preliminary question asking for preferred language of the presentation, then referenced candidate assets that are associated with languages other than English are not presented as visible candidate assets at each section from which the end user can select to add to an assembly from that template.

At 304, a selection of a (next) new section to add to the new presentation template is received. The designer user can configure information that describes (e.g., a section name) the new section or instructions that will be displayed, at assembly time, to the end user for the type of content that should be added for this section.

At 306, one or more input fields to add to the new section are optionally received. The designer user can optionally configure input fields that will prompt the end user for just-in-time inputs that will be included in an assembly built from the template.

At 308, configurations of references to a set of candidate assets stored at a content storage to associate with the new section are received. In one example of creating references to candidate assets, the designer user can manually select a subset of available assets from a content storage through a content storage interface to be referenced by the current section. In another example of creating references to candidate assets, the designer user can create a rule that includes a condition that, at assembly time, will locate candidate assets that match the condition to present as candidate assets that are referenced by the current section. Examples of such rules may prescribe that any assets that are included in a specified directory or file path at assembly time are candidate assets or any asset that is associated with a specified metadata tag at assembly time is a candidate asset.

At 310, whether there is at least one more new section to add to the new presentation template is determined. In the event that there is at least one more new section to add to the new presentation template, control is returned to 304. Otherwise, in the event that there are no more new sections to add to the new presentation template, control proceeds to 312.

At 312, the new presentation template is stored. The new presentation template comprises one or more sections and where each section includes at least the configurations made via the template designer user interface described in steps 302 through 308.

Figure 4:
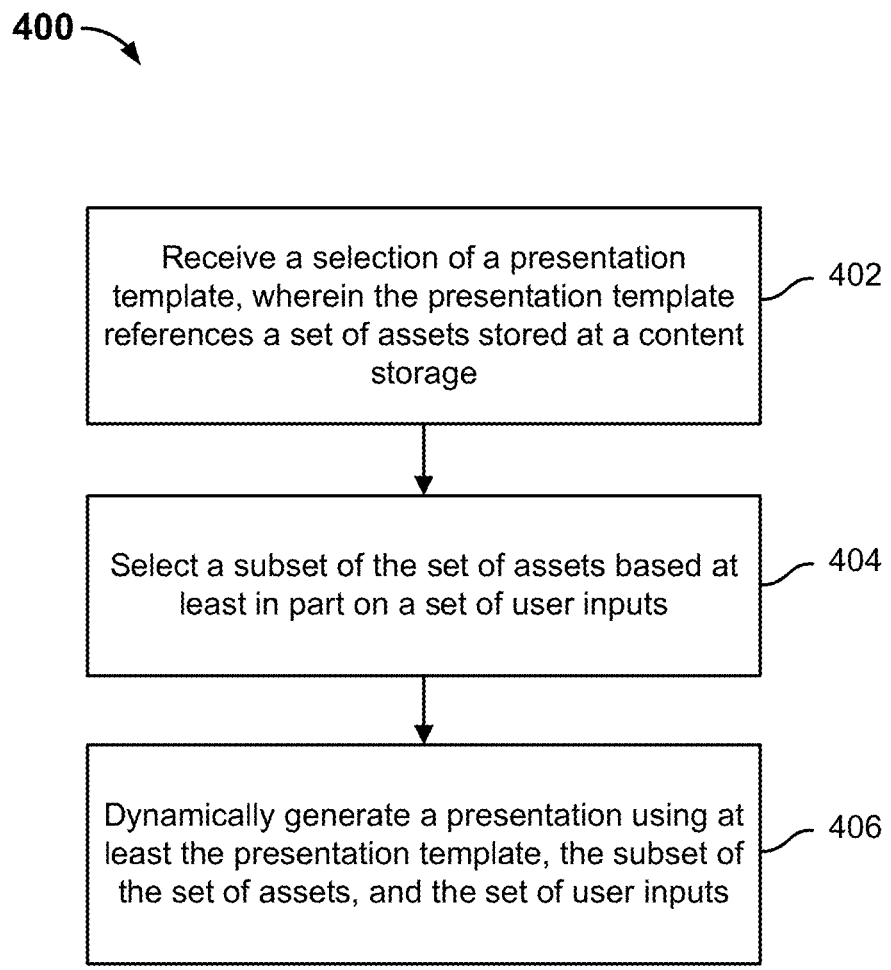
FIG. 4 is a flow diagram showing an embodiment of a process for dynamic presentation generation.

FIG. 4 is a flow diagram showing an embodiment of a process for dynamic presentation generation. In some embodiments, process 400 may be implemented at presentation assembly server 102 of FIG. 1.

At 402, a selection of a presentation template is received, wherein the presentation template references a set of assets stored at a content storage. For example, the presentation template that is associated with the theme of the presentation that an end user would like to create is selected. For example, the presentation template was created using a process such as process 300 of FIG. 3.

At 404, a subset of the set of assets is selected based at least in part on a set of user inputs. In various embodiments, a presentation template includes (e.g., preliminary) questions and one or more sections. A presentation assembly user interface guides the end user through the preliminary questions and each section of the presentation template by prompting the end user to input responses to the preliminary questions and also select among the candidate assets that are presented for each section. The user inputs that are collected at assembly time are sometimes referred to as the "just-in-time" inputs. The just-in-time inputs including the selections of candidate assets that are referenced by each section of the template form an assembly that is built from the template.

At 406, a presentation is dynamically generated using at least the presentation template, the subset of the set of assets, and the set of user inputs. In response to a request to output a presentation of a specified file type (e.g., a Google Slide®, a Microsoft PowerPoint®, a PDF, a video, a document) from the assembly built from the template, the template is dynamically translated to generate the requested presentation based on the assembly. In particular, during the translation, the selected candidate assets that are included in the assembly are dynamically obtained/pulled from the content storage and one or more construction engines that manipulate the underlying file format(s) of the pulled assets to generate a presentation of the specified file type that matches the outline prescribed by the template.

Figure 5:
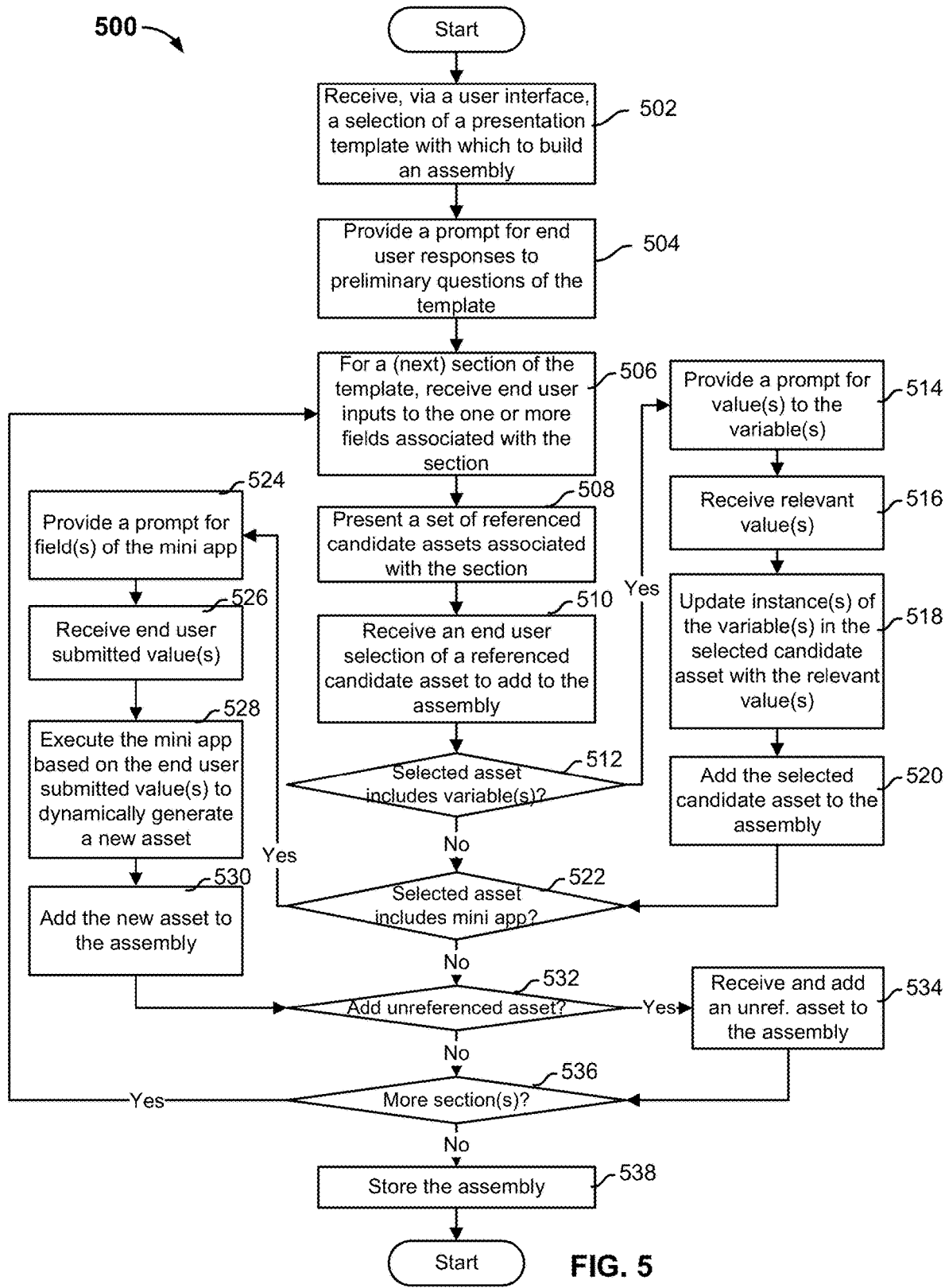
FIG. 5 is a flow diagram showing an example of a process for building an assembly using a selected presentation template in accordance with some embodiments.

FIG. 5 is a flow diagram showing an example of a process for building an assembly using a selected presentation template in accordance with some embodiments. In some embodiments, process 500 may be implemented at presentation assembly server 102 of FIG. 1. In some embodiments, steps 402 and 404 of process 400 of FIG. 4 may be implemented, at least in part, using a process such as process 500.

At 502, a selection of a presentation template with which to build an assembly is received via a presentation assembly user interface.

At 504, a prompt is provided for end user responses to preliminary questions of the template. The preliminary questions configured for the selected presentation template are provided at the presentation assembly user interface. In some embodiments, each preliminary question is presented as text with two or more options of responses from which the end user is to select. In some embodiments, if the response to the preliminary question comprises a value to a content property, then the response will be used to filter out candidate assets referenced by the sections of the template.

At 506, for a (next) section of the template, end user inputs to the one or more fields associated with the section are received. In some embodiments, the presentation assembly user interface presents an interactive interface to prompt for end user just-in-time inputs corresponding to each section of the template. In the event that the current section of the template includes one or more input fields to be completed by the end user, the fields and the type of data (e.g., text input, an image selection) that they are soliciting can be presented.

At 508, a set of referenced candidate assets associated with the section is presented. In some embodiments, the candidate assets (e.g., from a content storage) that were configured (e.g., by a designer user) to be relevant and therefore referenced by the current section are presented at a window within the presentation assembly user interface. In some embodiments, only the at least subset of the candidate assets that are referenced by the current section of the template and whose metadata (e.g., content properties) also matches the selected response(s) received at step 504 to the preliminary questions are presented as selectable options at the window. For example, if the preliminary question asked the end user for the desired language for the presentation and the end user had selected "French," then the candidate assets of the current section that are not tagged with "Language— French" are hidden from being presented as selectable options at the window.

At 510, an end user selection of a referenced candidate asset to add to the assembly is received. In some embodiments, the end user can add the selected referenced candidate asset as-is or the end user can select to add a portion of the selected referenced candidate asset to the presentation assembly. For example, if the selected referenced candidate asset were a set of 10 slides, then the end user has the option to select a subset of the 10 slides to include in the presentation assembly.

At 512, whether the selected referenced candidate asset includes variable(s) is determined. In the event that the selected reference candidate asset includes variable(s), control is transferred to 514. Otherwise, in the event that the selected reference candidate asset does not include variable(s), control is transferred to 522.

At 514, a prompt for value(s) to the variables that are embedded in the selected reference candidate asset is provided. If the selected referenced candidate asset includes one or more variables (e.g., that were configured by a content contributor user that had created the asset), then, in some embodiments, the presentation assembly user interface would prompt the end user to enter custom values to replace those variables. In some embodiments, a value corresponding to a variable may have been configured as a reference to a stored value (e.g., by a customer relationship management software) and so the stored value is programmatically received from the referenced storage location at assembly time.

At 516, relevant value(s) corresponding to the variables are received.

At 518, instance(s) of the variable(s) in the selected referenced candidate asset are updated with the current relevant values. Each instance of each variable that appears within the selected referenced candidate asset is updated with the received relevant value. For example, if the value "Acme Co." was received as the relevant value to the variable of "Client_Name," then each instance that the variable of "Client_Name" appears within the asset would be replaced by "Acme Co."

At 520, the selected referenced candidate asset is added to the assembly.

At 522, whether the selected reference candidate asset is a mini app is determined. In the event that the selected reference candidate asset is a mini app, control is transferred to 524. Otherwise, in the event that the selected reference candidate asset is not a mini app, control is transferred to 532.

At 524, a prompt is provided for field(s) of the mini app. As mentioned above, a mini app comprises a set of logic that is configured to execute using end user submitted values to generate a new asset to be included in the assembly.

At 526, end user submitted value(s) to the fields of the mini app are received. In some embodiments, a form included in the mini app that describes the one or more values to be solicited from the user can be presented at the presentation assembly user interface.

At 528, the mini app is executed based on the end user submitted value(s) to dynamically generate a new asset. The logic of the mini app executes configured computations based on the end user submitted value(s) to generate a new asset. For example, a mini app may include a form that solicits for one or more numerical values corresponding to one or more questions and then perform programmed computations to result in the generation of a new slide which includes predetermined text, graphics, and is also populated with dynamically computed results from the values received via the form. As such, different values that are input by end users in the form of a mini app at assembly time will result in the dynamic generation of different assets.

At 530, the new asset is added to the assembly.

At 532, whether the end user had indicated that the end user would like to create an unreferenced asset, control is transferred to 514. In the event that the end user did indicate an interest to create an unreferenced asset to be included in (e.g., reference by) the assembly of the template, control is transferred to 534. Otherwise, in the event that the end user would not like to create an unreferenced asset, control is transferred to 536.

At 534, an unreferenced asset to be added to the assembly is received. The end user may have the option to add an asset (one that is not already referenced from the content storage by a section of the template) at assembly time and then add it to the assembly that is created from the selected presentation template. In some embodiments, in response to the end user's selection to add such an unreferenced asset, the presentation assembly user interface presents an embedded interface to an application for asset creation (e.g., a slide deck software) through which the end user can create an asset while still creating the assembly at the presentation assembly user interface from a selected presentation template. In some embodiments, in response to the end user's selection to create such an unreferenced asset, the presentation assembly user interface presents an interface that enables the end user to upload a stored asset.

At 536, whether there is at least one more section of the template to complete is determined. In the event that there is at least one more section of the template to complete, control is returned to 506. Otherwise, in the event that there are no more sections of the template to complete, control is transferred to 538.

At 538, the assembly is stored with the selected presentation template. After the presentation assembly user interface has guided the end user through every section of the template, the assembly is complete and the completed assembly can be stored. The stored assembly can be used to output/export a presentation of a specified file type, as will be described in FIG. 6, below.

Figure 6:
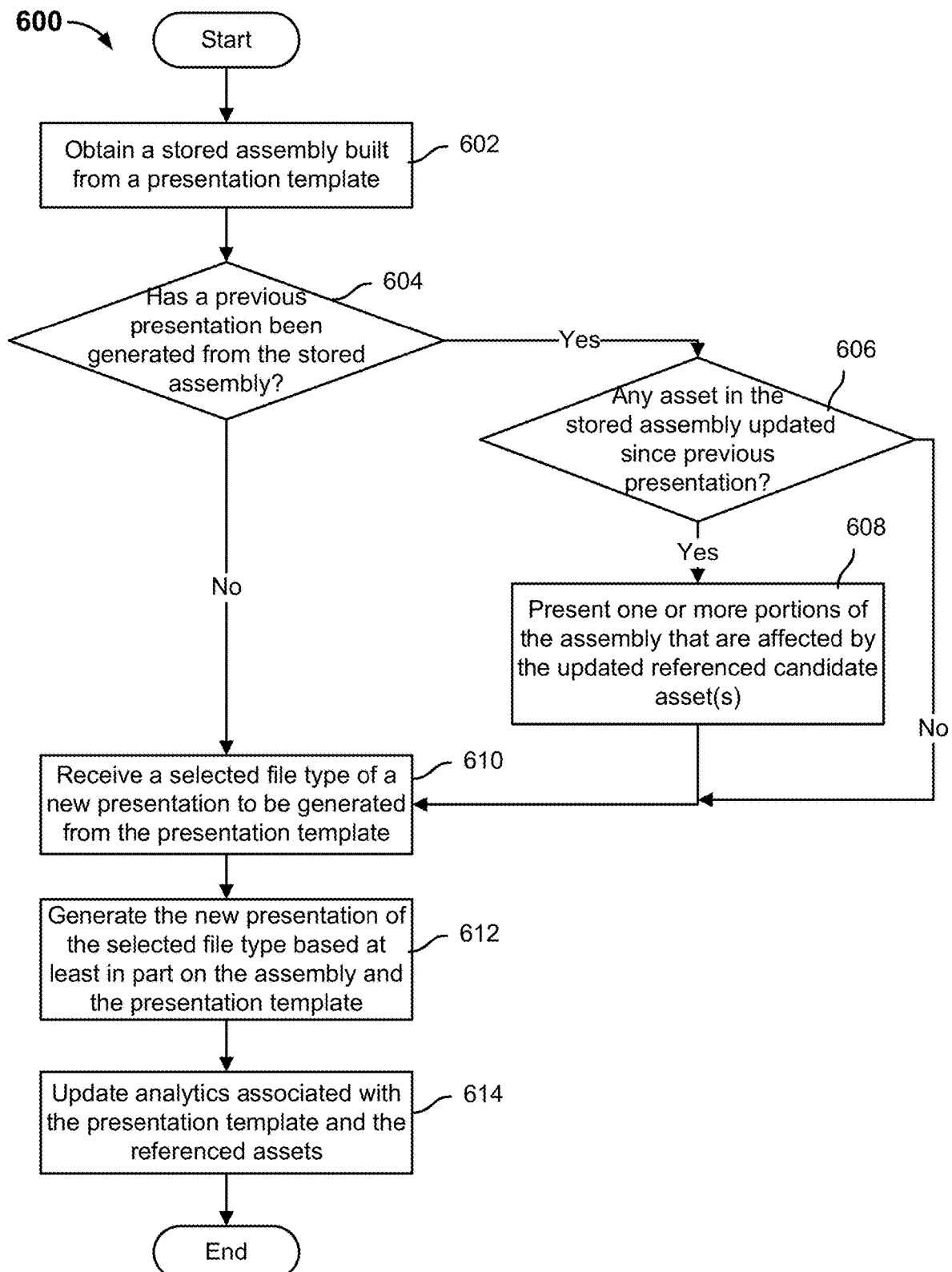
FIG. 6 is a flow diagram showing an example of a process for outputting a presentation based on an assembly built from a selected presentation template in accordance with some embodiments.

FIG. 6 is a flow diagram showing an example of a process for outputting a presentation based on an assembly built from a selected presentation template in accordance with some embodiments. In some embodiments, process 600 may be implemented at presentation assembly server 102 of FIG. 1. In some embodiments, step 406 of process 400 of FIG. 4 may be implemented, at least in part, using a process such as process 600.

At 602, a stored assembly built from a presentation template is obtained. In some embodiments, a presentation assembly is built from a selected presentation template and then stored using a process such as process 500 of FIG. 5. A request to generate/export a new presentation based on a stored assembly is received from the end user via the presentation assembly user interface.

At 604, whether a previous presentation has been previously generated from the stored assembly is determined. In the event that a previous presentation has been previously generated from the stored assembly, control is transferred to 606. Otherwise, in the event that a previous presentation has not been previously generated from the stored assembly, control is transferred to 610. As mentioned above, more than one instance of a presentation can be generated from an assembly built from a template. For example, presentations can be requested by an end user to be generated from a stored assembly at different points in time. In response to the current request to generate a presentation (e.g., of any selected file type), it is determined whether a presentation was previously generated from that same assembly.

At 606, whether any referenced candidate asset in the stored assembly has been updated since the previous presentation was generated is determined. In the event that any referenced candidate asset in the stored assembly has been updated since the previous presentation was generated, control is transferred to 608. Otherwise, in the event that no referenced candidate asset in the stored assembly has been updated since the previous presentation was generated, control is transferred to 610. A reason to check whether a presentation was previously generated from that same assembly is that, because in various embodiments, the selected referenced candidate assets are obtained from the content storage at the time of generating each presentation, at least some of such assets may have been updated since the generation of the previous presentation. An update to an asset may cause the presentation to contain different content than the previous presentation and therefore, this discrepancy should be notified to the end user.

At 608, one or more portions of the assembly that are affected by the updated referenced candidate asset(s) are presented. In some embodiments, the portions of the selected referenced candidate assets that are part of the assembly that have been updated since the previously generated presentation are indicated at the presentation assembly user interface so that the end user is made aware of the updates. In some embodiments, the highlighted changes in the updated asset(s) are presented (e.g., side-by-side) along with the previous versions of the asset(s) to emphasize what had changed since the previous version(s).

At 610, a selected file type of a new presentation to be generated from the presentation template is received. A file type to generate (output/export) the new presentation is received from the end user via the presentation assembly user interface. As mentioned above, example types of presentations include a Google Slide®, a Microsoft PowerPoint®, a PDF, a video, and a document.

At 612, the new presentation of the selected file type is generated based at least in part on the assembly and the template. In some embodiments, a construction engine that corresponds to the selected file type (e.g., one of Google Slide®, a Microsoft PowerPoint®, a PDF, a video, and a document) is invoked and the construction engine is configured to manipulate the template, the stored assembly including the obtained assets to convert the assets of assembly into a presentation in accordance with the series of sections outlined by the template. For example, if the template included two sections and the associated assembly included Slides_A that was the selection for the first section and Slides_B that was the selection for the second section, then the construction engine would convert Slides_A and Slides_B into the specified file type and then at least append Slides_B to the end of Slides_A so that the resulting output presentation would be a series of slides comprising the slides of Slides_A and Slides_B. In some other embodiments, a construction engine that corresponds to the file type of at least one of the obtained assets is used to manipulate the template, the stored assembly including the obtained assets to convert the assets of assembly into a presentation in accordance with the series of sections outlined by the template. For example, if the template included two sections and the associated assembly included Slides_A (a PowerPoint® file) that was a selection for the first section and Slides_B (a Google Slide® file) that was a selection for the second section, then a construction engine corresponding to PowerPoint would convert Slides_B into a PowerPoint® file and then merge it with Slides_A first and then convert the merged PowerPoint file into the requested PDF file so that the resulting output presentation would be a series of slides comprising the slides of Slides_A and Slides_B.

The generated presentation of the specified file type is then made available for download and/or available to be shared with another platform, for example.

At 614, analytics associated with the presentation template and the referenced assets are updated. Statistics regarding usage of the template including, for example, the frequency of building an assembly from a presentation template, which referenced candidate assets are actually selected to be included in each assembly, the frequency of outputting a presentation of a specified file type from an assembly, are tracked and stored. One reason to track such analytics is the analytics can be used as feedback to the content contributor users that create the assets and/or the designer users that create the templates on how their generated files are being used. Another reason to track such analytics is the analytics can be used to train machine learning models that can be leveraged to output, at assembly time, recommended candidate assets that end users can select for building a certain assembly from a selected presentation template given signals about that particular end user and/or build.

FIGS. 7, 8, 9, and 10 are diagrams that show example interfaces of a template designer tool that a designer user can use to create a presentation template in accordance with some embodiments.

Figure 7:
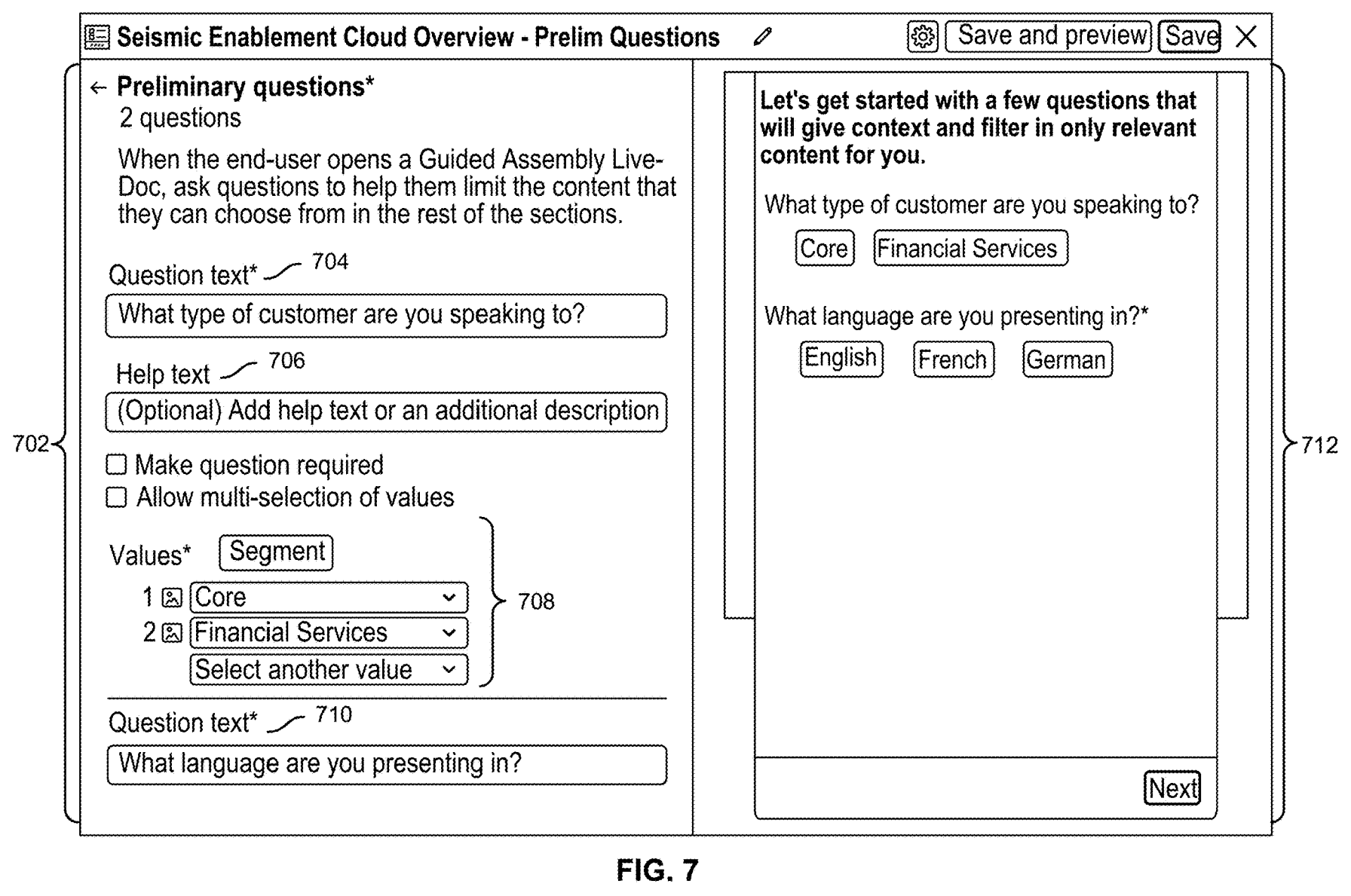

FIG. 7 is a diagram showing an example of a template designer user interface at which a designer user can configure preliminary questions of a presentation template. As shown in the example of FIG. 7, the presentation template that is currently being created/edited is called "Seismic Enablement Cloud Overview—Prelim Questions." In section 702 of the example user interface, the designer user can create a new preliminary question to be associated with a presentation template. For example, input field 704 allows the designer user to input the text for a preliminary question, which the designer user had input "What type of customer are you speaking to?" In input field 706, the designer user could optionally provide instructions or other helpful text with respect to the preliminary question of input field 704. In section 708, the designer user was enabled to select the content property metadata ("Segment") associated with the preliminary question of input field 704 and also select the possible values ("Core" and "Financial Services") corresponding to that content property that are to be presented as response options to the preliminary question. Input field 710 allows the designer user to input the text for the next preliminary question, which the designer user had input "What language are you presenting in?" Below input field 710, the designer user can configure help text and response options, which are not visible in FIG. 7. Section 712 of the example user interface shows a preview of the preliminary questions and response options as they would be presented to an end user in a presentation assembly user interface during the building of an assembly from the template. As mentioned above, during the building of an assembly from the template, the end user's selection of a response to a preliminary question will filter out the candidate assets referenced in the sections of that template that are not tagged with that response.

Figure 8:
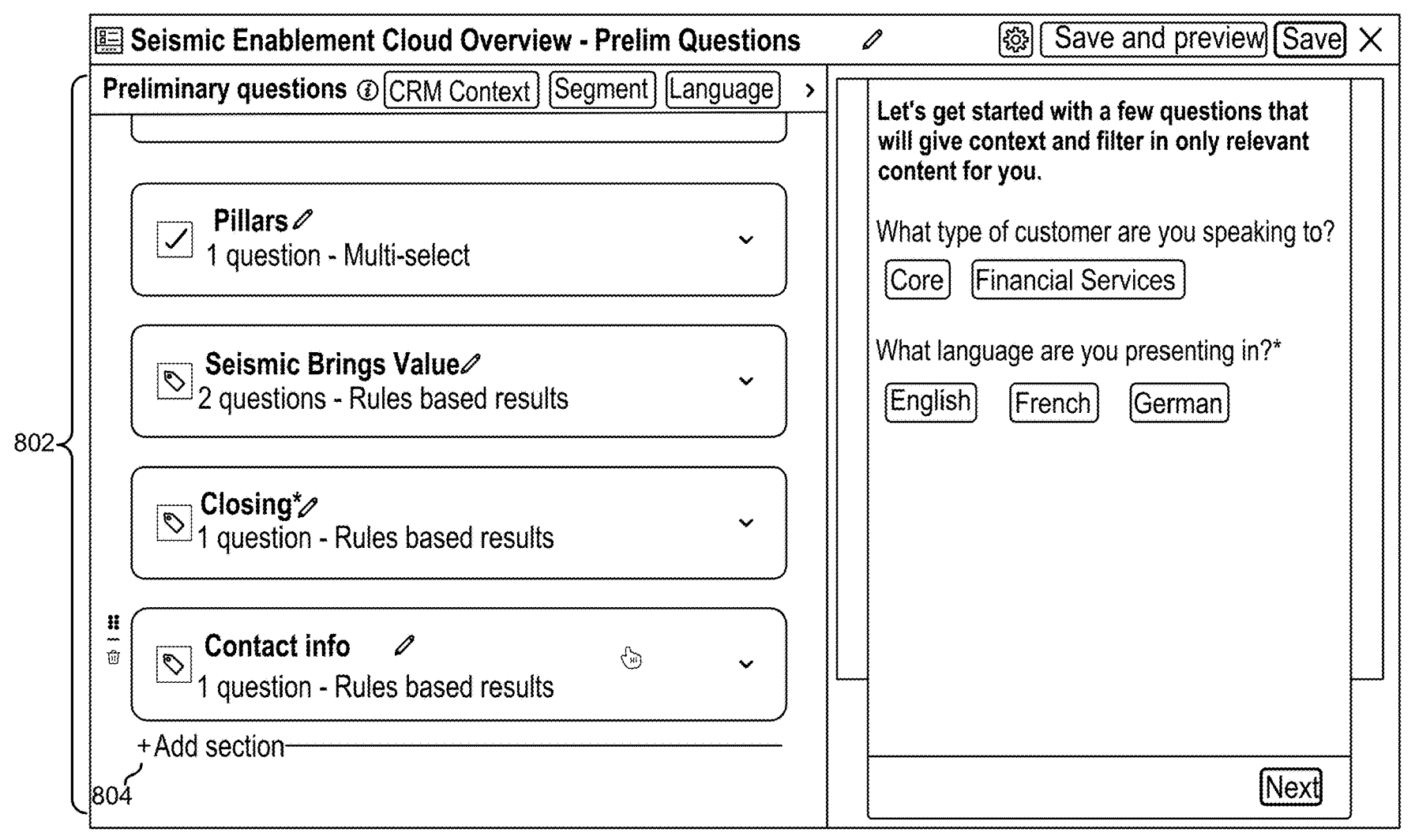

FIG. 8 is a diagram showing an example of a template designer user interface at which a designer user can configure new sections of a presentation template. As shown in the example of FIG. 8, the presentation template that is currently being created/edited is called "Seismic Enablement Cloud Overview—Prelim Questions." In section 802 of the example user interface, the designer user can see a summary of the preliminary questions and sections that the user has already configured for the template. As shown in section 802, the user has already configured the sections titled "Pillars," "Seismic Brings Value," "Closing," and "Contact Info." To add a new section to the template, the designer user can select interactive element 804 titled "+Add section."

Figure 9:
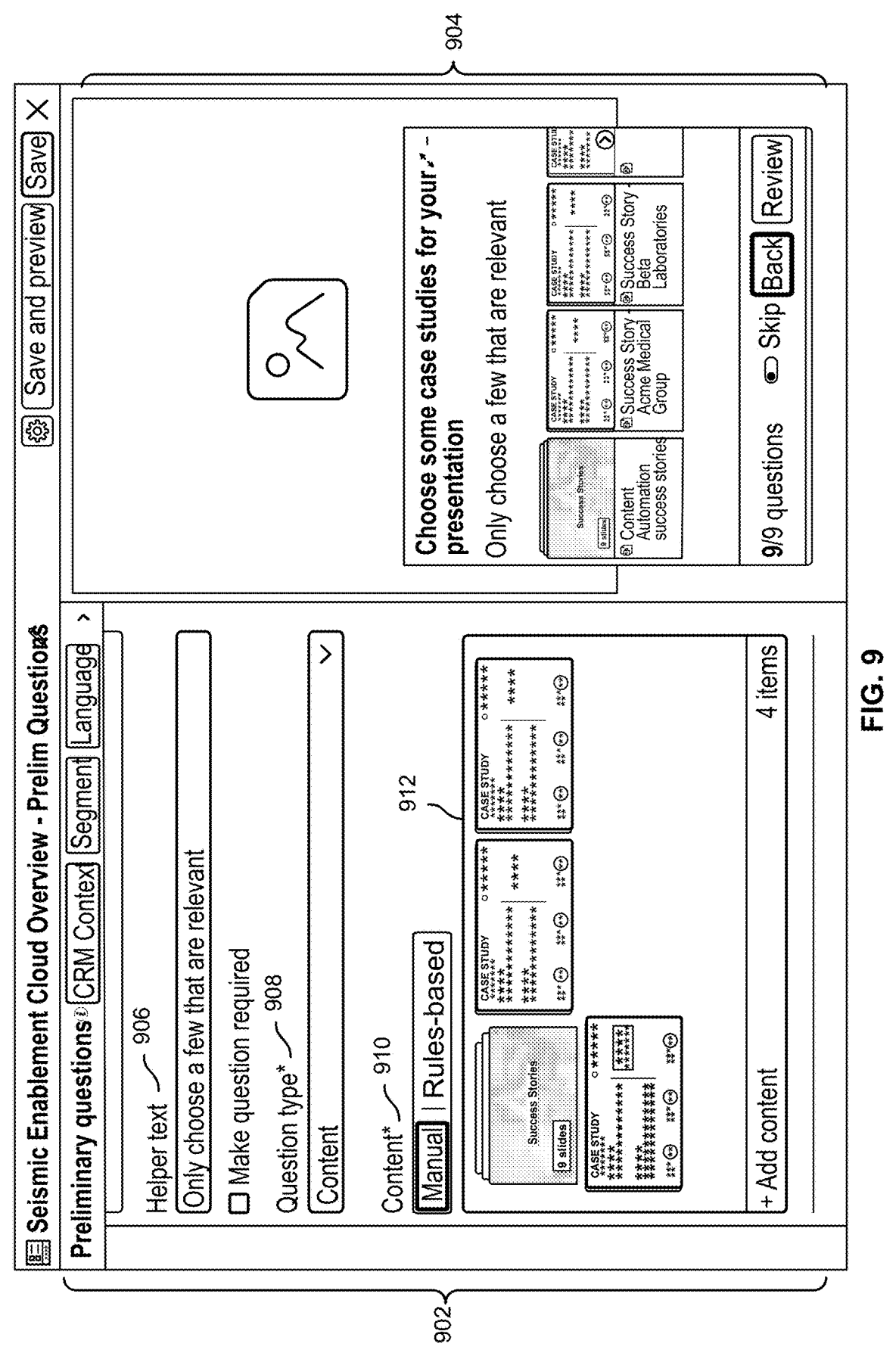

FIG. 9 is a diagram showing an example of a template designer user interface at which a designer user can configure aspects of a particular section of a presentation template. As shown in the example of FIG. 9, the presentation template that is currently being created/edited is called "Seismic Enablement Cloud Overview—Prelim Questions." In section 902 of the example user interface, the designer user can configure the components of a particular section of the template associated with presenting case studies. For example, input field 906 allows the designer user to optionally provide instructions or other helpful text with respect to the current section. In section 908 ("Question type"), the designer user is able to select a question type that can either involve presenting assets directly to the end user or first ask the end user a "Just in time" question about their situation and then based off their response, present them a set of assets to choose from. If the designer user chooses "Content" as the question type, then at assembly time, this section of the template directly presents candidate asset selection. If the designer user chooses "Category" as the question type, then at assembly time, this section of the template adds the step of defining the set of categories (a just-in-time inputs) first, then the end user will choose content for each category. In particular, at section 908, at design time, the designer user was enabled to select between the options of "Content" or "Category." As a result of selecting the "Content" option in section 908, the designer user was directly presented with content selection interface 910, which is an interface for selecting the candidate assets (e.g., from a content storage) to reference in this section, and therefore, become possible assets among which the end user can (later) select in the presentation assembly user interface. In the example of FIG. 9, the designer user had selected the "Manual" mode under content selection interface 910, which entailed the designer user manually selecting the four candidate assets represented by four respective thumbnails in window 912. Section 904 of the example user interface shows a preview of the section's text and candidate assets as they would be presented to an end user in a presentation assembly user interface during the building of an assembly from the template.

Alternatively, if the designer user had selected the "Category" option in section 908 (which is not shown in FIG. 9), then the designer user would have been additionally presented with a category definition interface before being presented with an interface for selecting the candidate assets (e.g., from a content storage) from each defined category to reference in this section.

Figure 10:
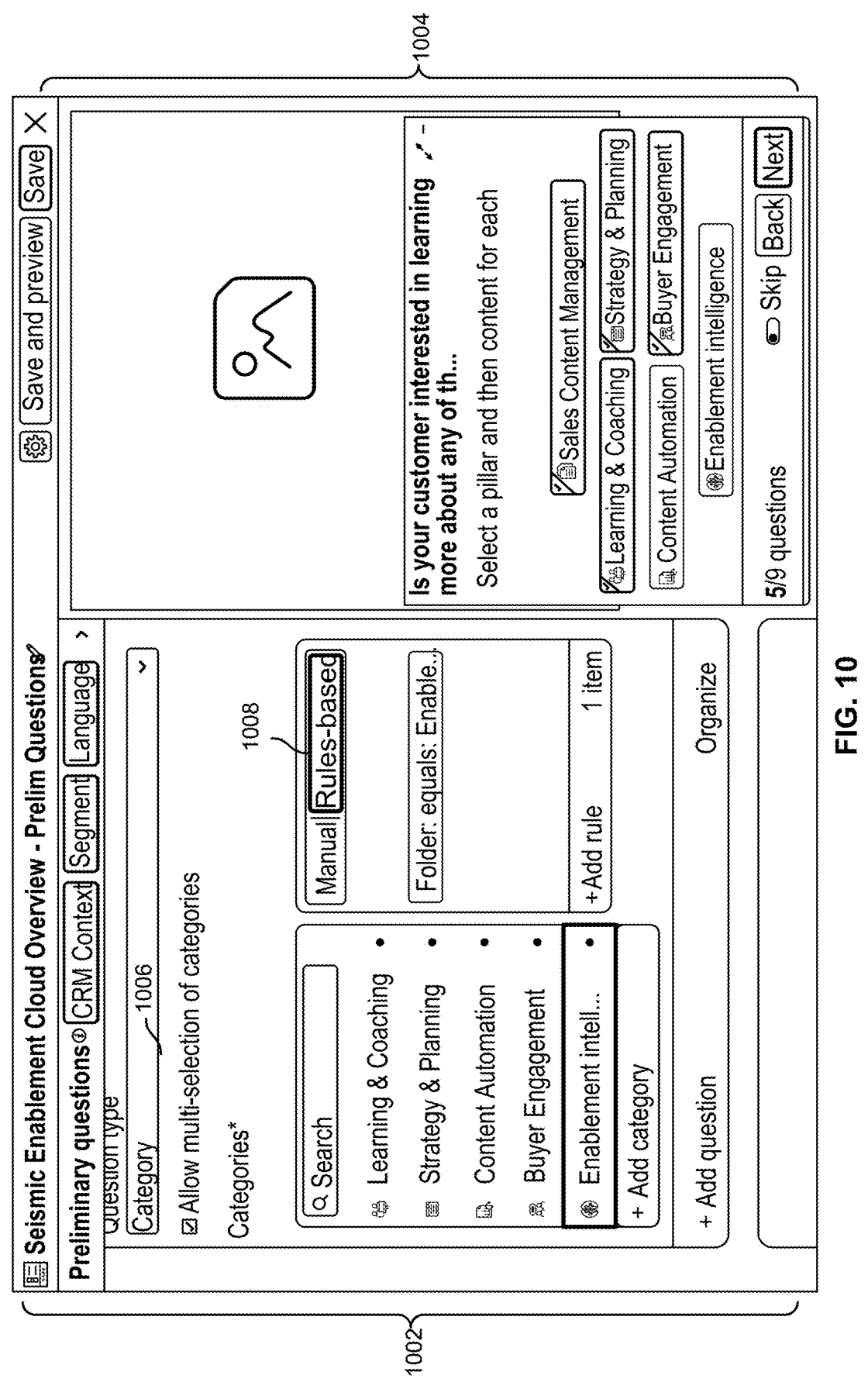

FIG. 10 is a diagram showing another example of a template designer user interface at which a designer user can configure aspects of a particular section of a presentation template. As shown in the example of FIG. 10, the presentation template that is currently being created/edited is called "Seismic Enablement Cloud Overview—Prelim Questions." In section 1002 of the example user interface, the designer user can configure the components of a particular section of the template associated with presenting case studies. In section 1002, the designer user was enabled to select the candidate assets (e.g., from a content storage) to reference in this section, and therefore, become possible assets among which the end user can (later) select in the presentation assembly user interface. In the example of FIG. 10, the designer user had selected the option of "Category" under section 1006 ("Question type") and then selected the "Rules-based" mode 1008. While not shown in FIG. 10, even if the designer had selected the option of "Content" under section 1006, the designer user would also be presented with the option to either reference candidate assets manually or using rules. Rules-based enables designer users to write queries to the content storage as opposed to manually choosing the content from the storage. These queries are executed when the template is launched (e.g., at assembly time) and pulls in the latest approved assets from the content storage that meet the criteria of the query. Specifically, in the example of FIG. 10, the designer user had configured a condition that any assets that are included in the identified category of "Enablement intelligence" at assembly time can be presented as a candidate asset in this section in the presentation assembly user interface. Section 1004 of the example user interface shows a preview of the section's text and candidate assets as they would be presented to an end user in a presentation assembly user interface during the building of an assembly from the template.

FIGS. 11, 12, 13, 14, 15, 16, and 17 are diagrams that show example interfaces of an end user tool that an end user can use to build an assembly and output a presentation from a selected presentation template in accordance with some embodiments.

Figure 11:
FIG. 11 is a diagram showing an example of a presentation assembly user interface at which an end user can respond to the preliminary questions of a selected presentation template.

FIG. 11 is a diagram showing an example of a presentation assembly user interface at which an end user can respond to the preliminary questions of a selected presentation template. As shown in the example of FIG. 11, the presentation template that is currently selected and used to build a presentation assembly is called "Seismic Enablement Cloud Overview—Prelim Questions." In some embodiments, preliminary questions are optionally added to a presentation template by a designer user. In the example of FIG. 11, the presentation assembly user interface presents three different preliminary questions from the template. For example, the preliminary questions in the template may have been configured by a designer user using a template designer user interface such as the example template designer user interface that is shown in FIG. 7. In the example of FIG. 11, the first preliminary question 1102 asks the end user whether the assembly of a presentation that they are building is directed to customers in the "Core" or "Financial Services" segment. The second preliminary question 1104 asks the end user whether the assembly of a presentation they are building is in "English," "French," or "German." The third preliminary question 1106 asks the end user whether the assembly of a presentation that they are building is directed to a customer is in the "EMEA," "APAC," or "US" geographic region. When a template includes preliminary questions, the preliminary questions are presented to an end user at the beginning of an assembly so that the end user's selected responses can be used to filter out/limit the referenced candidate assets that will be presented in the later sections of the template. In the example of FIG. 11, assuming that the end user had selected responses to all three preliminary questions, then the referenced candidate assets that will be presented in the subsequently guided sections of the template will exclude the asset(s) that do not match the selected responses. For example, if the end user had responded to the preliminary questions with "Financial Services," "English," and "US," then the referenced candidate assets that will be presented as available options to select for each section of the presentation assembly user interface will only include assets that are tagged with the content property values of "Financial Services," "English," and "US."

Figure 12:
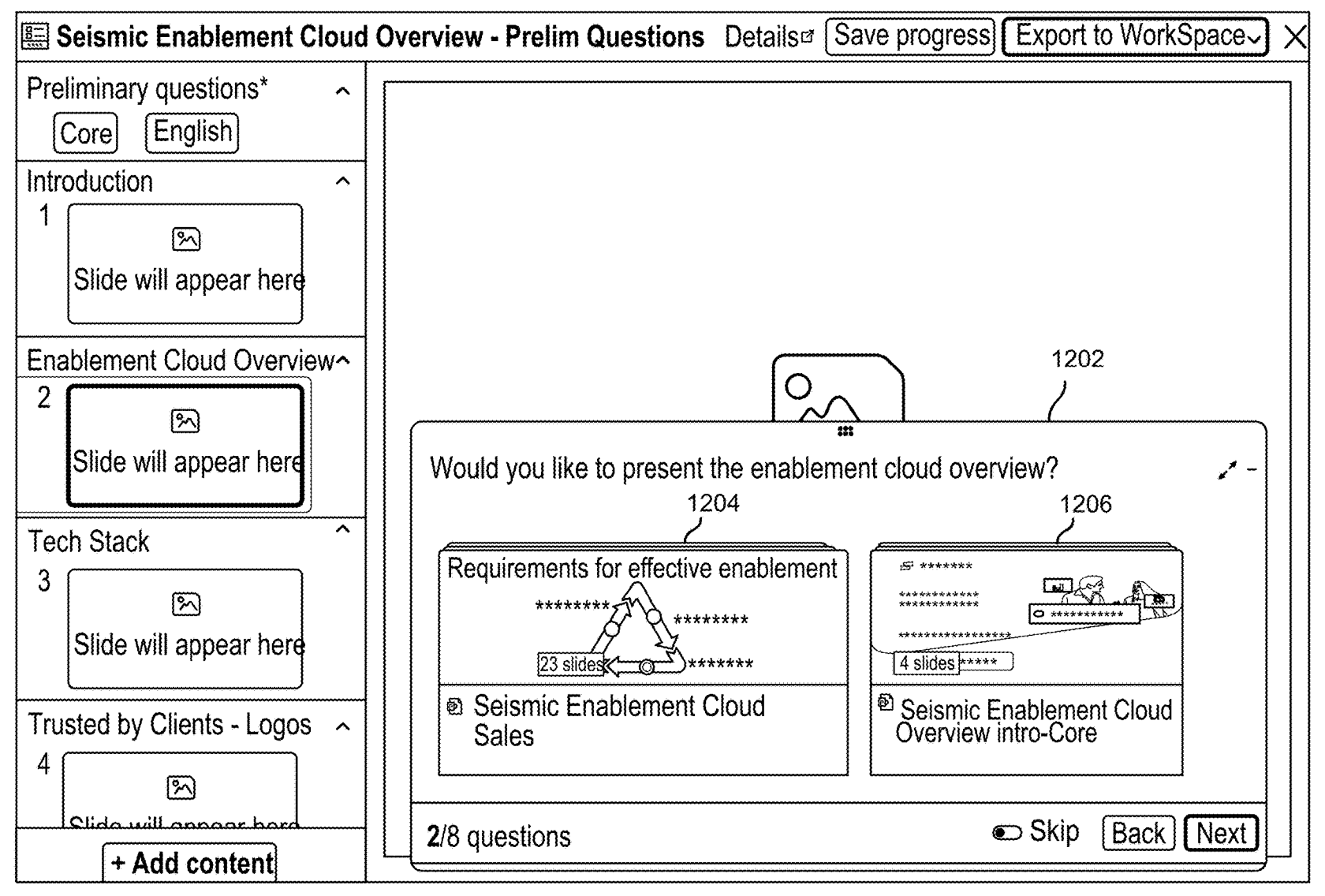

FIG. 12 is a diagram showing an example of a presentation assembly user interface at which an end user can select a referenced candidate asset within a particular section of a selected presentation template. As shown in the example of FIG. 12, the presentation template that is currently selected and used to build a presentation assembly is called "Seismic Enablement Cloud Overview—Prelim Questions." In the example of FIG. 12, the presentation assembly user interface presents, on the left-hand side, a preview of a portion of the eight sections (which are also sometimes referred to as "Questions" in the template) ("Introduction," "Enablement Cloud Overview," "Tech Stack," "Trusted by Clients—Logos," etc.) of the presentation template and the end user can select any of the sections to edit the assembly associated with that section. The end user has selected to edit section 2 titled "Enablement Cloud Overview." In response to the end user's selection of section 2 titled "Enablement Cloud Overview," the presentation assembly user interface had presented window 1202, which includes the candidate assets that had been configured to be referenced by that section (and that match the selected responses to the preliminary questions). In the example of FIG. 12, the referenced candidate assets that are presented in window 1202 include assets 1204 (a slide deck titled "Seismic Enablement Cloud Sales") and 1206 (a slide deck titled "Seismic Enablement Cloud Overview intro-Core"). Each of assets 1204 and 1206 is a respective set of slides that are relevant to section 2. The end user can select one of the candidate assets presented in window 1202 to correspond to the selected candidate asset of section 2 to be included in the assembly being built.

Figure 13:
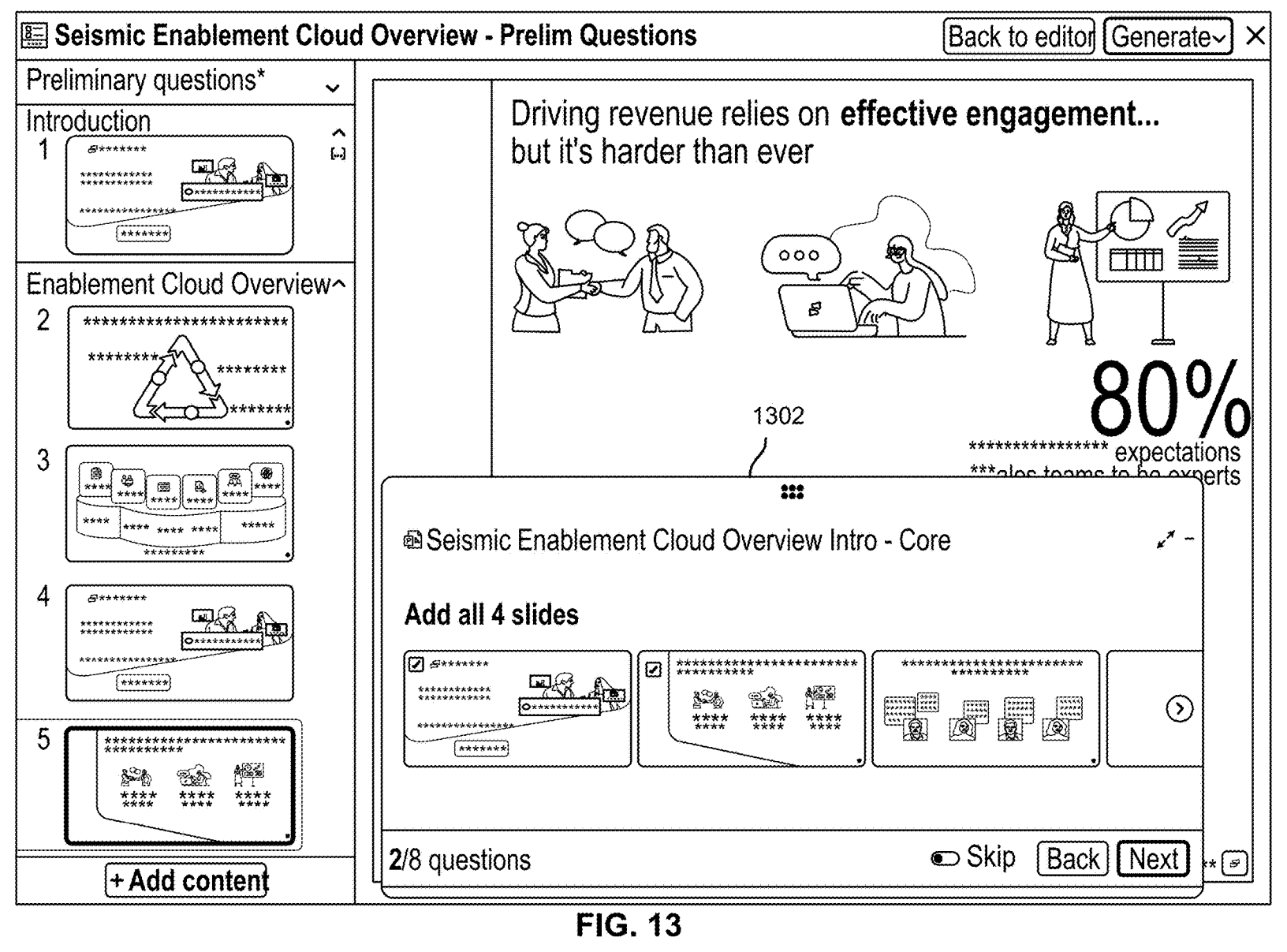

FIG. 13 is a diagram showing another example of a presentation assembly user interface at which an end user can edit a selected referenced candidate asset within a particular section of a selected presentation template. FIG. 13 shows the example user interface that is presented in response to the end user selecting candidate asset 1206 (a slide deck titled "Seismic Enablement Cloud Overview intro-Core") for section 2 that was shown in FIG. 12. As shown in FIG. 13, after selecting the candidate asset, window 1302 is presented to enable the end user to edit candidate asset 1206 prior to adding the asset into the assembly currently being built. For example, because candidate asset 1206 comprises multiple slides (four slides), window 1302 presents the four individual slides of candidate asset 1206 to allow the end user the option of selecting fewer than all four slides to add into the assembly, if desired.

Figure 14:
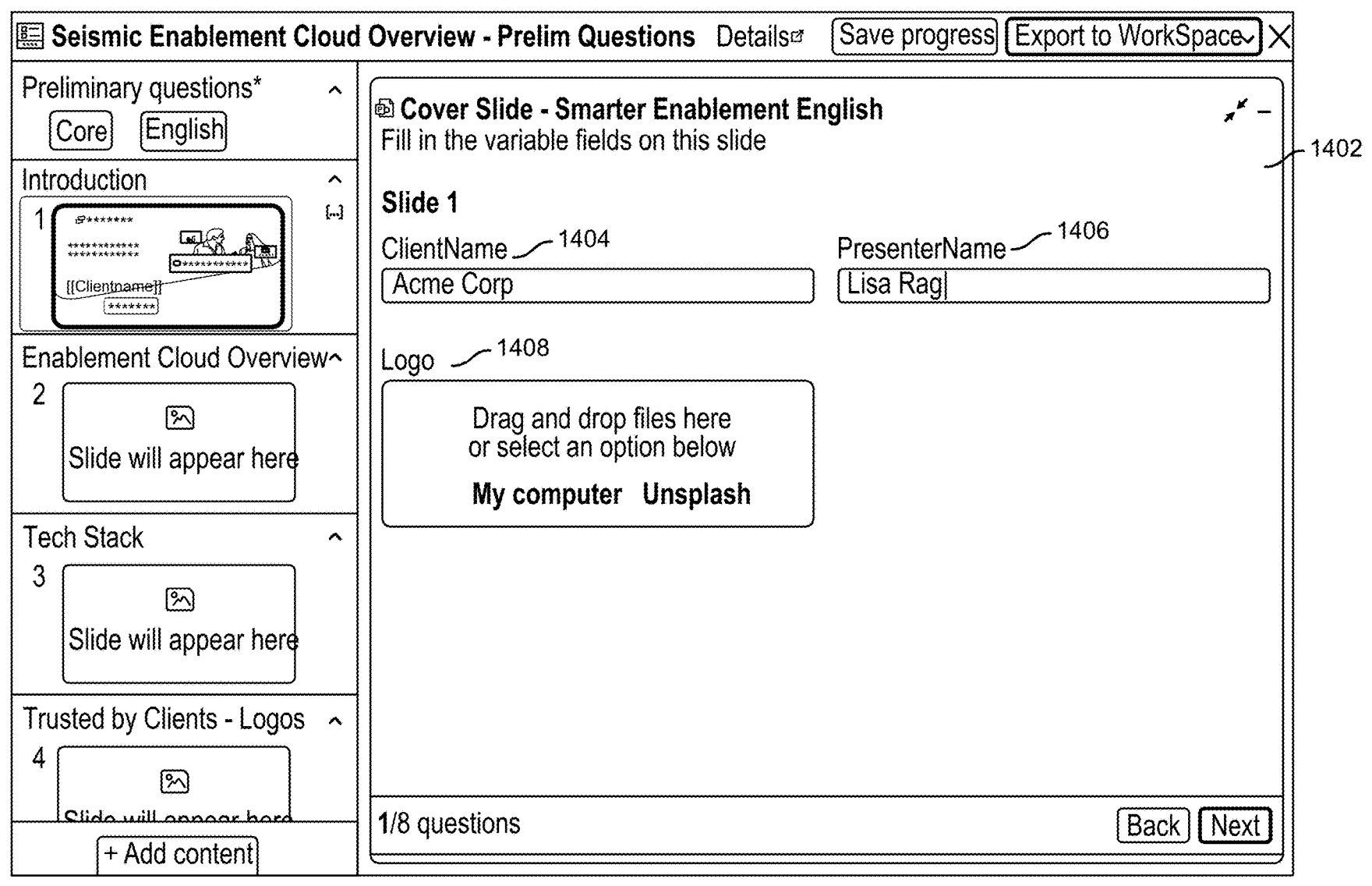

FIG. 14 is a diagram showing an example of a presentation assembly user interface at which an end user is prompted to provide values corresponding to variables embedded in a selected candidate asset within a particular section of a selected presentation template. As shown in the example of FIG. 14, the presentation template that is currently selected and used to build a presentation assembly is called "Seismic Enablement Cloud Overview—Prelim Questions." In the example of FIG. 14, the presentation assembly user interface presents, on the left-hand side, a preview of a portion of the eight sections (which are also sometimes referred to as "Questions" in the template) ("Introduction," "Enablement Cloud Overview," "Tech Stack," "Trusted by Clients—Logos," etc.) of the presentation template and the end user can select any of the sections to edit the assembly associated with that section. The end user has selected to edit section 1 titled "Introduction" and also a candidate asset that was referenced by section 1 in the template. In response to the end user's selection of the candidate asset of section 1 titled "Introduction," the end user tool had detected three different variables that were embedded in the selected asset. For example, a variable (e.g., a placeholder) for text that is embedded in an asset may be appear in the form of "[[variable]]." As a consequence of detecting the three different variables, the presentation assembly user interface had presented window 1402, which prompts the end user to submit values or data corresponding to each of the variables. Specifically, values/data are prompted for variables named ClientName 1404, PresenterName 1406, and Logo 1408. The end user is prompted to input text values corresponding to each of ClientName 1404 and PresenterName 1406 and is prompted to optionally select an image corresponding to Logo 1408. As a result of the end user's submissions for the variables named ClientName 1404, PresenterName 1406, and Logo 1408, each instance of each such variable within that asset will be replaced with the end user submissions within the assembly that is currently being built.

FIG. 15 is a diagram showing an example of a presentation assembly user interface at which an end user is prompted to provide values corresponding to a form associated with a selected candidate asset comprising a mini app within a particular section of a selected presentation template. As shown in the example of FIG. 15, the presentation template that is currently selected and used to build a presentation assembly is called "Pitch Presentation Template." In the example of FIG. 15, the presentation assembly user interface presents, on the left-hand side, a preview of a portion of the six sections (which are also sometimes referred to as "Questions" in the template) (including "Products," "Case Studies," and "Appendix") of the presentation template and the end user can select any of the sections to edit the assembly associated with that section. The end user has selected to edit section 6 titled "Appendix" and also a candidate asset that was referenced by section 6 in the template. In the example of FIG. 15, the selected asset comprises a mini app that is named "Time Savings Calculator." The mini app includes form 1502, as presented by the presentation assembly user interface in FIG. 15, that solicits the user for a selection (for a relevant "Use Case") and values (for "Content Count," "Total Downloads," "Avg Seller Salary ($USD)," "Time Spent Per Unique Output Today (manual)," and "Time Spent Per Unique Output w/Guided Assembly"). In response to the end user's submitted selection and values input at form 1502, the logic associated with the mini app is configured to execute to generate one or more computations based on the submissions and dynamically insert the computation results into predetermined portions of a new asset to add to the current assembly being built, which will be described below in FIG. 16.

FIG. 16 is a diagram showing an example of a presentation assembly user interface at which an end user had provided values to a form associated with a selected candidate asset comprising a mini app within a particular section of a selected presentation template. FIG. 16 shows the example user interface that is presented in response to the end user submitting the selection and values in form 1502 of FIG. 15. As shown in FIG. 16, based on the selection and values in form 1502 of FIG. 15, the logic associated with the "Time Savings Calculator" mini app executed to determine computation results includes the "1000" for "Total Pitch Decks in Seismic," "900" for "Total Downloads (over past 12 mos)," "60 mins" for "Time Spent Personalizing Before (per asset)," "5 mins" for "Time Spent Personalizing After (per asset)," "900 Hours" for "Spent over previous year personalizing pitch decks," "825 Hours" for "You could have saved," and "$24,750" for "Capacity Equivalent based on hours you could have saved." Furthermore, the logic associated with the mini app also dynamically generated a new asset, slide 1602, that includes the computation results formatting according to a configured format and also placed within predetermined text and structure. As such, slide 1602, which is dynamically generated by the selected candidate asset for section 6 comprising a mini app, is added as the asset corresponding to section 6 of the current assembly being built.

In the event that the end user wants to save the current assembly, the end user can select "Save Progress" button 1604. In the event that the end user wants to generate a presentation of a specified file type from the current assembly, the end user can select "Export to WorkSpace" button 1606. In response to the end user's selection of "Export to WorkSpace" button 1606, while not shown in FIG. 16, the presentation assembly user interface may present a set of file type options (e.g., a Google Slide®, a Microsoft PowerPoint®, a PDF, a video, and a document) that a presentation can be generated into based on the current assembly built on the template.

Figure 17:
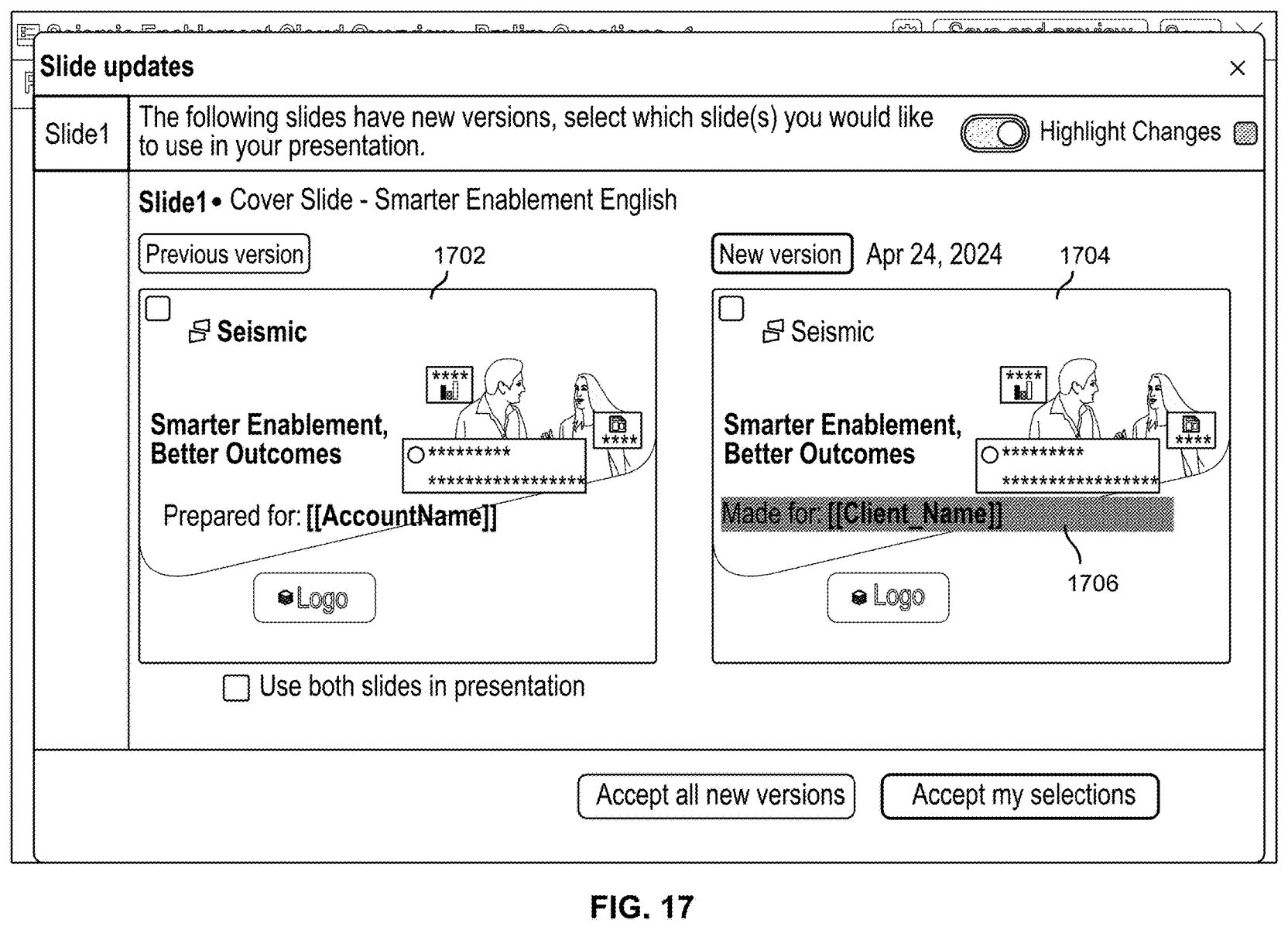

FIG. 17 is a diagram showing an example of a presentation assembly user interface that presents a notification that a selected candidate asset that is included in an assembly built from a selected presentation template has been updated. In some embodiments, in response to an end user request to generate a presentation of a specified file type from an assembly that is built from a selected presentation template (e.g., if the end user had selected a button such as "Export to WorkSpace" button 1606 as shown in the example user interface of FIG. 16), the end user tool is configured to obtain the selected candidate assets associated with the sections of the template. Due to this link between the template and the selected candidate assets that are stored at a content storage, the end user tool can detect whether any of the selected candidate assets that are included in the assembly have been updated (e.g., since the assembly was created or when a previous presentation was generated from the assembly) at the time of presentation generation. In the event that a selected candidate asset has been updated, the end user tool can present the updated version of the asset and highlight the visual differences between the updated version of the asset and a previous version to denote the changes. For example, in FIG. 17, the presentation assembly user interface presents previous version 1702 of an asset comprising a slide (e.g., where the previous version was the version of the asset when the assembly was made and/or when a previous presentation was generated from the assembly) and new version 1704 of the slide and highlighting the visual updates in portion 1706. This way, the end user can see that new version 1704 of the slide states "Made for: [[Client_Name]]" (wherein [[Client_Name]] is a variable) which replaced the text "Prepared for: [[AccountName]]" (wherein [[AccountName]] is a variable) in the previous version. In this way, the end user can decide whether they wish to proceed to generate a new presentation using the new version of the asset or (e.g., a cached instance of) the previous version of the asset.

Figure 18:
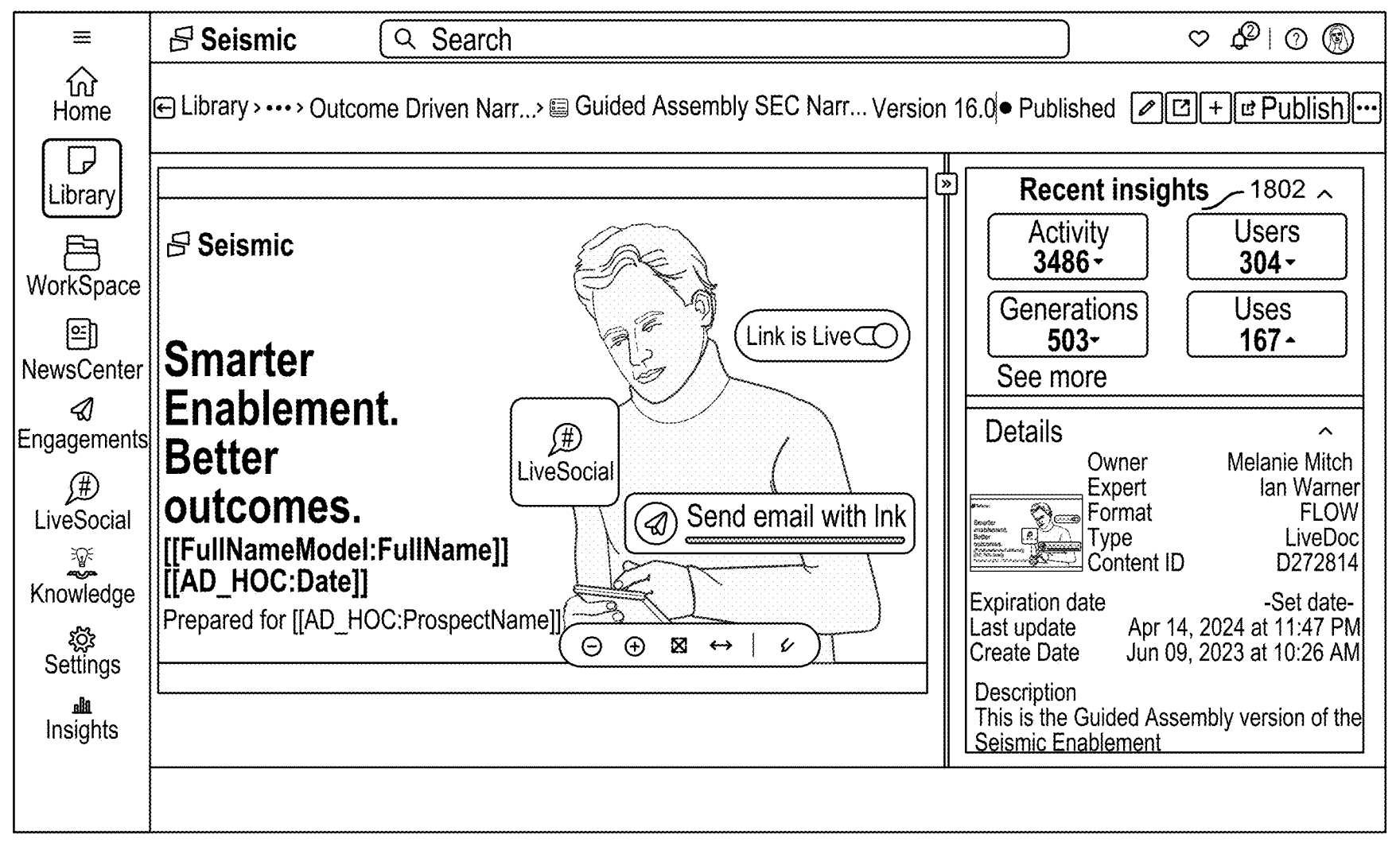

FIG. 18 is a diagram showing an example of a presentation assembly user interface that is presenting analytics regarding the usage of a selected presentation template. As mentioned above, the usage of each presentation template, the assemblies generated from each template, and/or the candidate assets referenced by each template can be tracked over time. As shown in the example of FIG. 18, section 1802 shows analytics (e.g., "Activity," "Users," "Generations," and "Uses") that have been kept track of for a selected presentation template. In some embodiments, the "Activity" analytic is how many times a user has viewed the template. In some embodiments, the "Users" analytic is how many end users had activity with the template. In some embodiments, the "Generations" analytic is how many times a presentation instance was generated from the template. In some embodiments, the "Uses" analytic is how many times the presentation instances were distributed outside the system.

As described herein, in various embodiments, to assist an end user to efficiently generate a presentation, a stored presentation template may be presented as one or more intake forms to collect situational information to determine when to use information (who, what, where, etc.) that filters down a set of candidate assets referenced by the template. The selections of candidate assets that should be included in a presentation assembly include just what is relevant (e.g., to the end user that requested the presentation or to the intended audience of the presentation) at that point in time. The approach to referencing the assets from a content storage (a content library) in the template allows the template to be a digital outline for variations of presentations that can be built from the template. In various embodiments, a presentation template is agnostic to the file type of presentation that can be ultimately generated from it. It is when an end user provides the just-in-time input needed, that a presentation of a specified file type is actually created in the specified file type via a construction engine that fetches all the relevant assets and operates on the XML/JSON, for example, of those template files. Put another way, in response to a request to generate a specified presentation file type for an end user, the selected presentation type agnostic template can be dynamically translated into a presentation of the selected presentation file type and that includes assets that are relevant to that user.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a content storage configured to store a plurality of assets; and
one or more processors configured to:
receive a selection of a presentation template, wherein the presentation template is file type agnostic, wherein the presentation template includes a series of at least a first section and a second section, wherein the first section of the presentation template references a first subset of candidate assets from the content storage and the second section of the presentation template references a second subset of candidate assets from the content storage;

receive a set of responses to a set of preliminary questions associated with the presentation template;

present, at a presentation assembly user interface, corresponding to the first section of the presentation template, a first filtered version of the first subset of candidate assets referenced by the first section, wherein the first filtered version comprises a first portion of the first subset of candidate assets whose metadata matches the set of responses and hides a second portion of the first subset of candidate assets whose metadata does not match the set of responses;

receive, at the presentation assembly user interface, a first user input to select a first candidate asset from the first filtered version of the first subset of candidate assets to include in the first section of the presentation template;

present, at the presentation assembly user interface, corresponding to the first section of the presentation template, a second filtered version of the second subset of candidate assets referenced by the second section, wherein the second filtered version comprises a first portion of the second subset of candidate assets whose metadata matches the set of responses and hides a second portion of the second subset of candidate assets whose metadata does not match the set of responses;

receive, at the presentation assembly user interface, a second user input to select a second candidate asset from the second filtered version of the second subset of candidate assets to include in the second section of the presentation template; and dynamically generate a presentation of a specified file type using at least the presentation template and a set of user inputs including the first and second user inputs, wherein the presentation of the specified file type comprises the first candidate asset in the specified file type in the first section of the presentation template and the second candidate asset in the specified file type in the second section of the presentation template.

2. The system of claim 1, wherein an asset stored at the content storage is tagged with one or more content properties.

3. The system of claim 1, wherein the one or more processors are further configured to:
receive, via a template designer user interface, the set of preliminary questions to be associated with the presentation template;
receive a selection of a new section to add to the presentation template; and
receive configurations of references to a third subset of candidate assets stored at the content storage to associate with the new section.

4. The system of claim 3, wherein to receive the configurations of the references to the third subset of candidate assets stored at the content storage to associate with the new section comprises to receive manual selections of the third subset of candidate assets.

5. The system of claim 3, wherein to receive the configurations of the references to the third subset of candidate assets stored at the content storage to associate with the new section comprises to receive a rule comprising a condition that identifies the third subset of candidate assets.

6. The system of claim 3, wherein the one or more processors are further configured to present, at the presentation assembly user interface, the set of preliminary questions.

7. The system of claim 1, wherein the one or more processors are further configured to:
determine that a selected asset comprises an embedded variable;
prompt, at the presentation assembly user interface, for a value corresponding to the embedded variable; and
update one or more instances of the embedded variable within the selected asset with the value.

8. The system of claim 1, wherein the one or more processors are further configured to:
determine that a selected candidate asset comprises a mini app;
present, at the presentation assembly user interface, a form that prompts for a set of values associated with the mini app;
receive the set of values through the form; and
use the mini app to execute a set of logic based at least in part on the set of values to generate a new asset to be included in the presentation.

9. The system of claim 1, wherein the one or more processors are further configured to:
receive, via the presentation assembly user interface, an indication to add an unreferenced asset; and
receive an uploaded asset to be included in the presentation.

10. The system of claim 1, wherein to dynamically generate the presentation comprises to:
receive the specified file type of the presentation to generate;
dynamically obtain the first candidate asset and the second candidate asset from the content storage; and
use a construction engine corresponding to the specified file type to translate the first candidate asset, the second candidate asset, and the set of user inputs into the presentation of the specified file type according to the presentation template.

11. The system of claim 10, wherein the one or more processors are further configured to:
determine that the first candidate asset obtained from the content storage has been updated; and
output a presentation that highlights one or more visual differences between a new version of the first candidate asset and a previous version of the first candidate asset.

12. The system of claim 1, wherein the one or more processors are further configured to store analytics associated with historical usage of the presentation template.

13. The system of claim 12, wherein the one or more processors are further configured to recommend a third user input into an assembly being built from the presentation template based at least in part on the analytics.

14. A method, comprising:
receiving a selection of a presentation template, wherein the presentation template is file type agnostic, wherein the presentation template includes a series of at least a first section and a second section, wherein the first section of the presentation template references a first subset of candidate assets from a content storage and the second section of the presentation template references a second subset of candidate assets from the content storage;

receiving a set of responses to a set of preliminary questions associated with the presentation template;

presenting, at a presentation assembly user interface, corresponding to the first section of the presentation template, a first filtered version of the first subset of candidate assets referenced by the first section, wherein the first filtered version comprises a first portion of the first subset of candidate assets whose metadata matches the set of responses and hides a second portion of the first subset of candidate assets whose metadata does not match the set of responses;

receiving, at the presentation assembly user interface, a first user input to select a first candidate asset from the first filtered version of the first subset of candidate assets to include in the first section of the presentation template;

presenting, at the presentation assembly user interface, corresponding to the first section of the presentation template, a second filtered version of the second subset of candidate assets referenced by the second section, wherein the second filtered version comprises a first portion of the second subset of candidate assets whose metadata matches the set of responses and hides a second portion of the second subset of candidate assets whose metadata does not match the set of responses;

receiving, at the presentation assembly user interface, a second user input to select a second candidate asset from the second filtered version of the second subset of candidate assets to include in the second section of the presentation template; and dynamically generating a presentation of a specified file type using at least the presentation template and a set of user inputs including the first and second user inputs, wherein the presentation of the specified file type comprises the first candidate asset in the specified file type in the first section of the presentation template and the second candidate asset in the specified file type in the second section of the presentation template.

15. The method of claim 14, wherein an asset stored at the content storage is tagged with one or more content properties.

16. The method of claim 14, further comprising:

receiving, via a template designer user interface, the set of preliminary questions to be associated with the presentation template;

receiving a selection of a new section to add to the presentation template; and receiving configurations of references to a third subset of candidate assets stored at the content storage to associate with the new section.

17. The method of claim 16, wherein receiving the configurations of the references to the third subset of candidate assets stored at the content storage to associate with the new section comprises receiving manual selections of the third subset of candidate assets.

18. The method of claim 16, wherein receiving the configurations of the references to the third subset of candidate assets stored at the content storage to associate with the new section comprises receiving a rule comprising a condition that identifies the third subset of candidate assets.

19. A computer program product embodied in a non-transitory computer readable medium and comprising computer instructions for:

receiving a selection of a presentation template, wherein the presentation template is file type agnostic, wherein the presentation template includes a series of at least a first section and a second section, wherein the first section of the presentation template references a first subset of candidate assets from a content storage and the second section of the presentation template references a second subset of candidate assets from the content storage;

receiving a set of responses to a set of preliminary questions associated with the presentation template;

presenting, at a presentation assembly user interface, corresponding to the first section of the presentation template, a first filtered version of the first subset of candidate assets referenced by the first section, wherein the first filtered version comprises a first portion of the first subset of candidate assets whose metadata matches the set of responses and hides a second portion of the first subset of candidate assets whose metadata does not match the set of responses;

receiving, at the presentation assembly user interface, a first user input to select a first candidate asset from the first filtered version of the first subset of candidate assets to include in the first section of the presentation template;

presenting, at the presentation assembly user interface, corresponding to the first section of the presentation template, a second filtered version of the second subset of candidate assets referenced by the second section, wherein the second filtered version comprises a first portion of the second subset of candidate assets whose metadata matches the set of responses and hides a second portion of the second subset of candidate assets whose metadata does not match the set of responses;

receiving, at the presentation assembly user interface, a second user input to select a second candidate asset from the second filtered version of the second subset of candidate assets to include in the second section of the presentation template; and dynamically generating a presentation of a specified file type using at least the presentation template and a set of user inputs including the first and second user inputs, wherein the presentation of the specified file type comprises the first candidate asset in the specified file type in the first section of the presentation template and the second candidate asset in the specified file type in the second section of the presentation template.

* * * * *